(12) United States Patent
Hinata et al.

(10) Patent No.: US 6,882,390 B2
(45) Date of Patent: Apr. 19, 2005

(54) ELECTRO-OPTIC APPARATUS INCLUDING REFLECTION FILM WITH TRANSMISSION HOLES AND WIRING PATTERNS FORMED OF SAME METAL FILM AS REFLECTION FILM

(75) Inventors: Shoji Hinata, Matsumoto (JP); Kazuyoshi Sakai, Misato-mura (JP); Kotaro Ueno, Misato-mura (JP)

(73) Assignee: Seiko Epson Corporation (JP)

( * ) Notice: Subject to any disclaimer, the term of this patent is extended or adjusted under 35 U.S.C. 154(b) by 35 days.

(21) Appl. No.: 10/666,954

(22) Filed: Sep. 18, 2003

(65) Prior Publication Data

US 2004/0121628 A1 Jun. 24, 2004

(30) Foreign Application Priority Data

Sep. 18, 2002 (JP) ........................ 2002-271478

(51) Int. Cl.$^7$ ...................... G02F 1/1335; G02F 1/1345
(52) U.S. Cl. ...................... 349/114; 349/149; 349/152
(58) Field of Search ................................. 349/113, 114, 349/149–152

(56) References Cited

U.S. PATENT DOCUMENTS 6,414,337 B1    7/2002  Day et al. ...................... 257/72
6,747,723 B1 *  6/2004  Hanakawa et al. ......... 349/147

FOREIGN PATENT DOCUMENTS

JP    2002-014334    1/2002

* cited by examiner

Primary Examiner—Tarifur R. Chowdhury
(74) Attorney, Agent, or Firm—Harness, Dickey & Pierce, P.L.C.

(57) ABSTRACT

In an electro-optic apparatus, a base electrically conductive film made from an ITO film, an optical reflection film made from a silver alloy film, a color filter layer, an organic insulating film serving as a flattening film, an inorganic insulating film made from a silicon oxide film or others, first driving electrodes made from an ITO film, and an alignment film are formed in that order in the first substrate. Second wiring patterns which connect mounting terminals to first inter-substrate electric-connection terminals are made from metal wiring formed together with the optical reflection film at the same time. The second wiring patterns are disconnected at an area exposed from a second substrate, and wiring formed together with first driving electrodes at the same time is formed at the area.

16 Claims, 23 Drawing Sheets

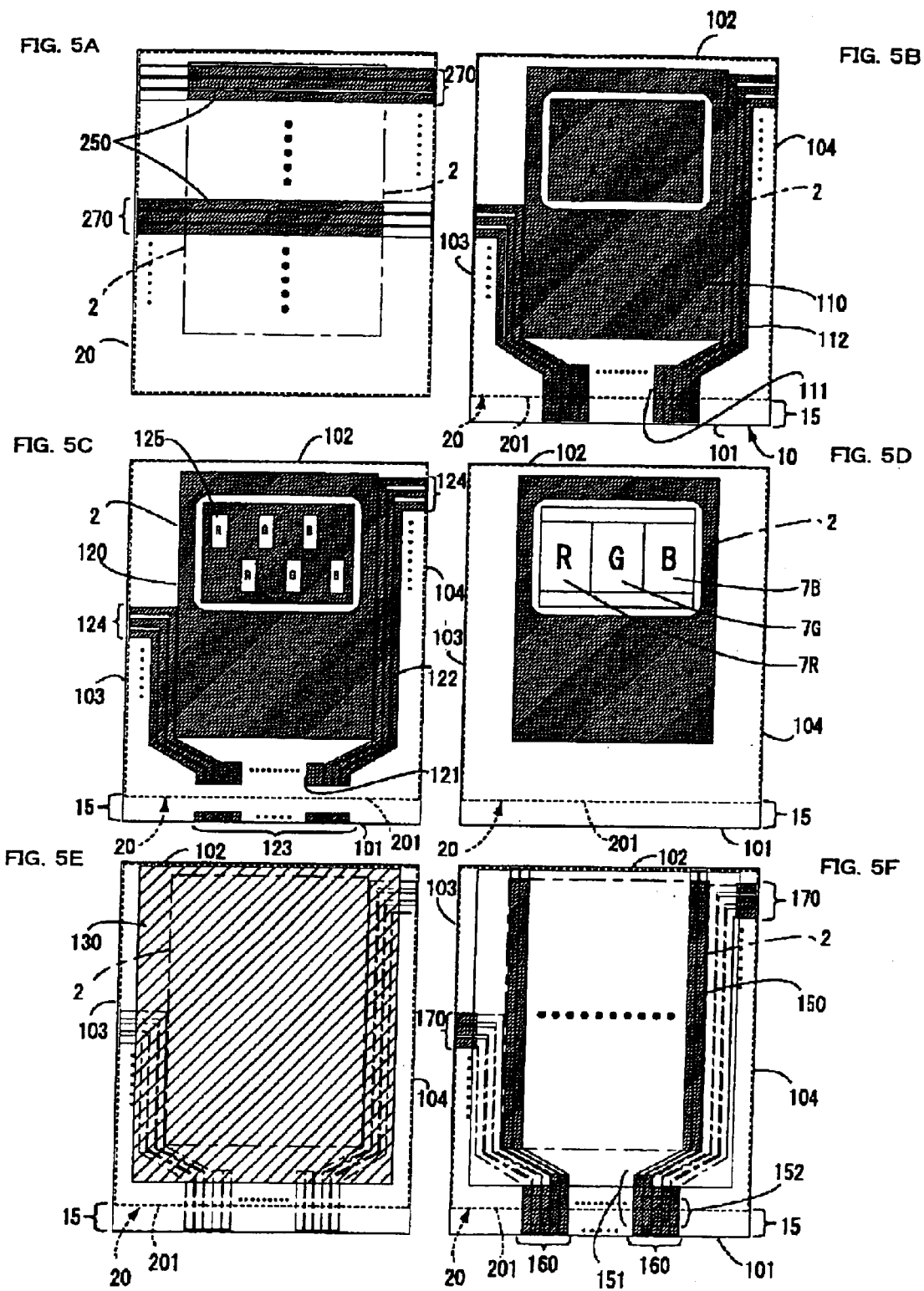

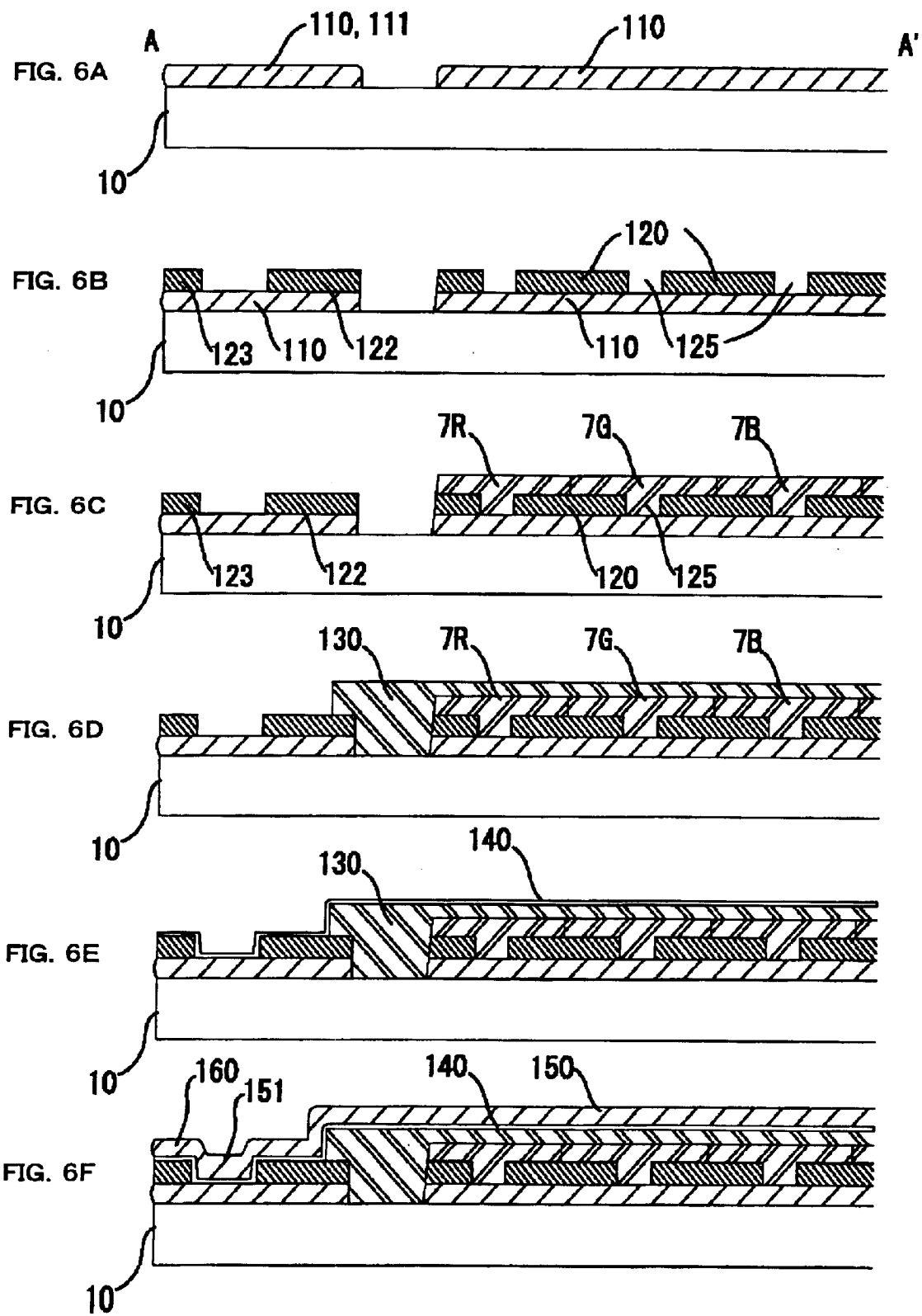

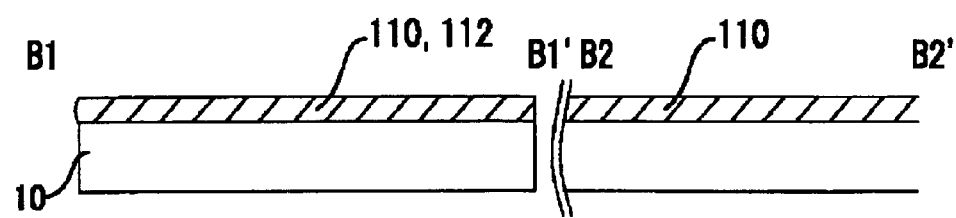
FIG. 11A
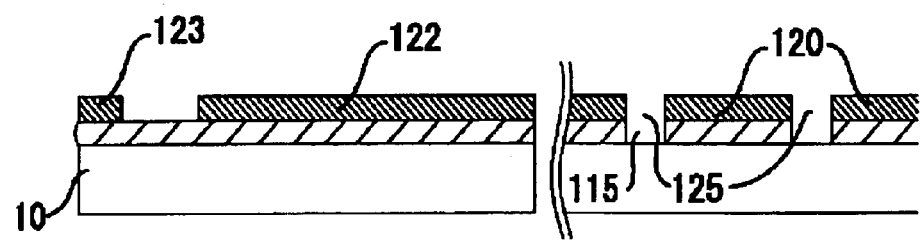
FIG. 11B
FIG. 11C
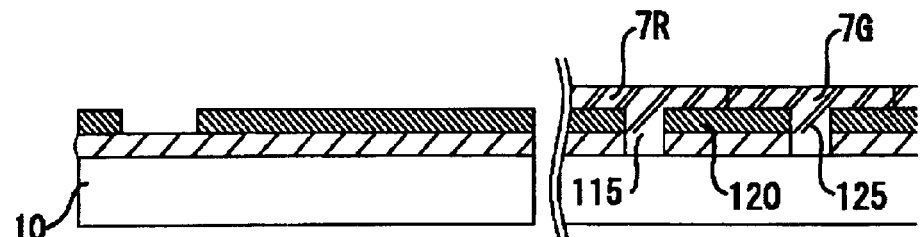
FIG. 11D
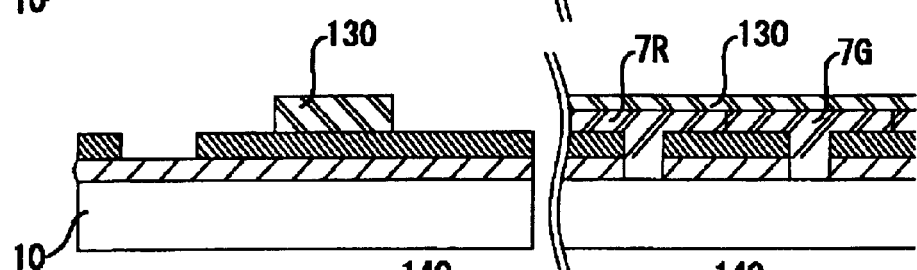
FIG. 11E
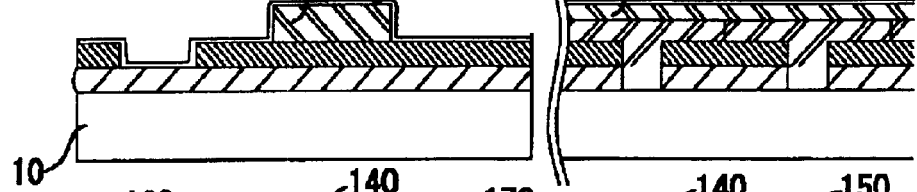
FIG. 11F
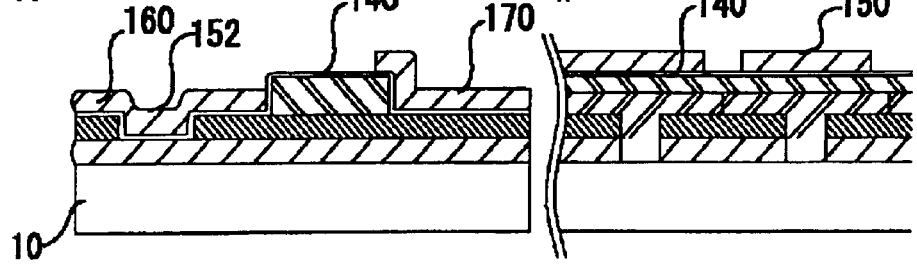

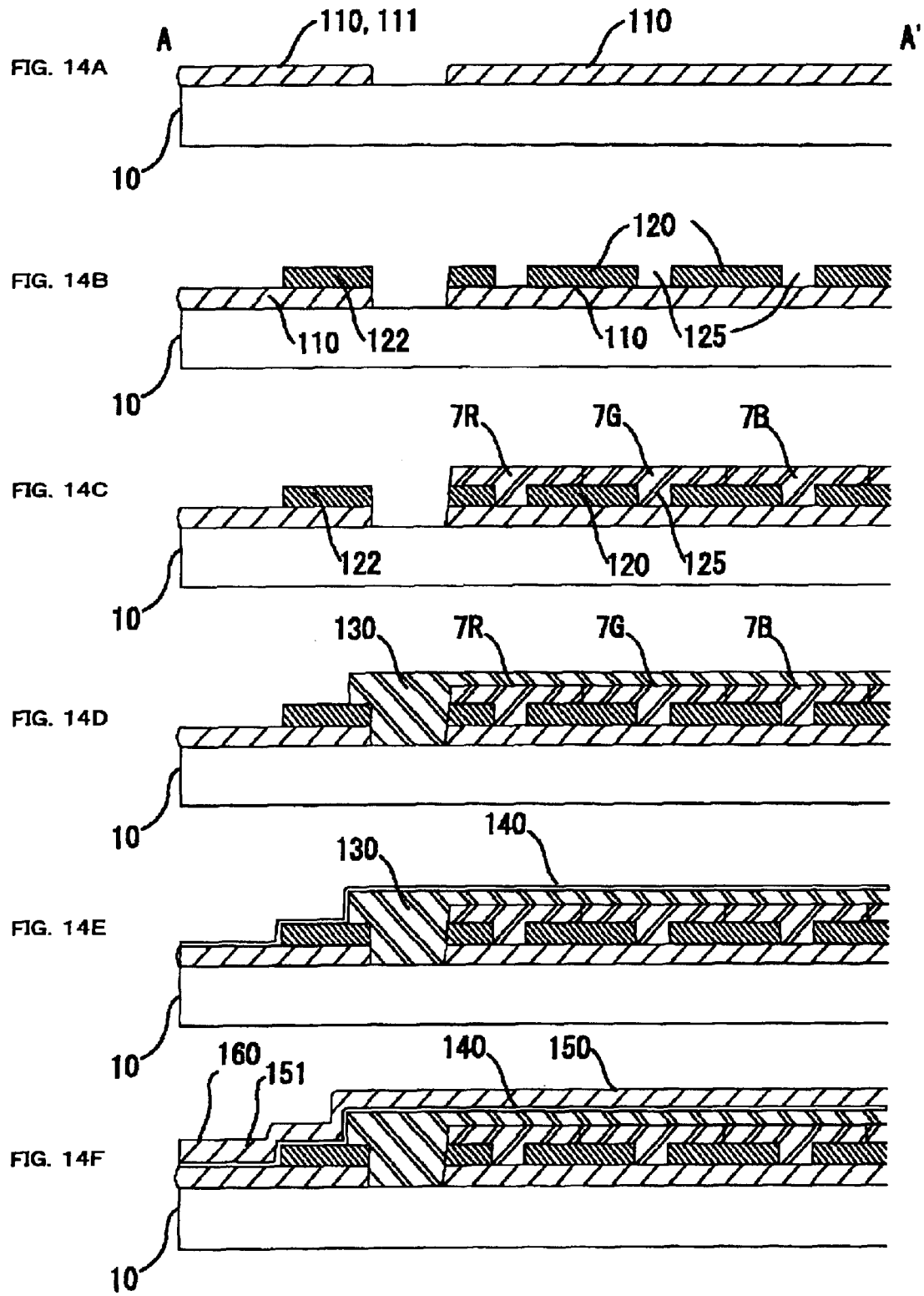

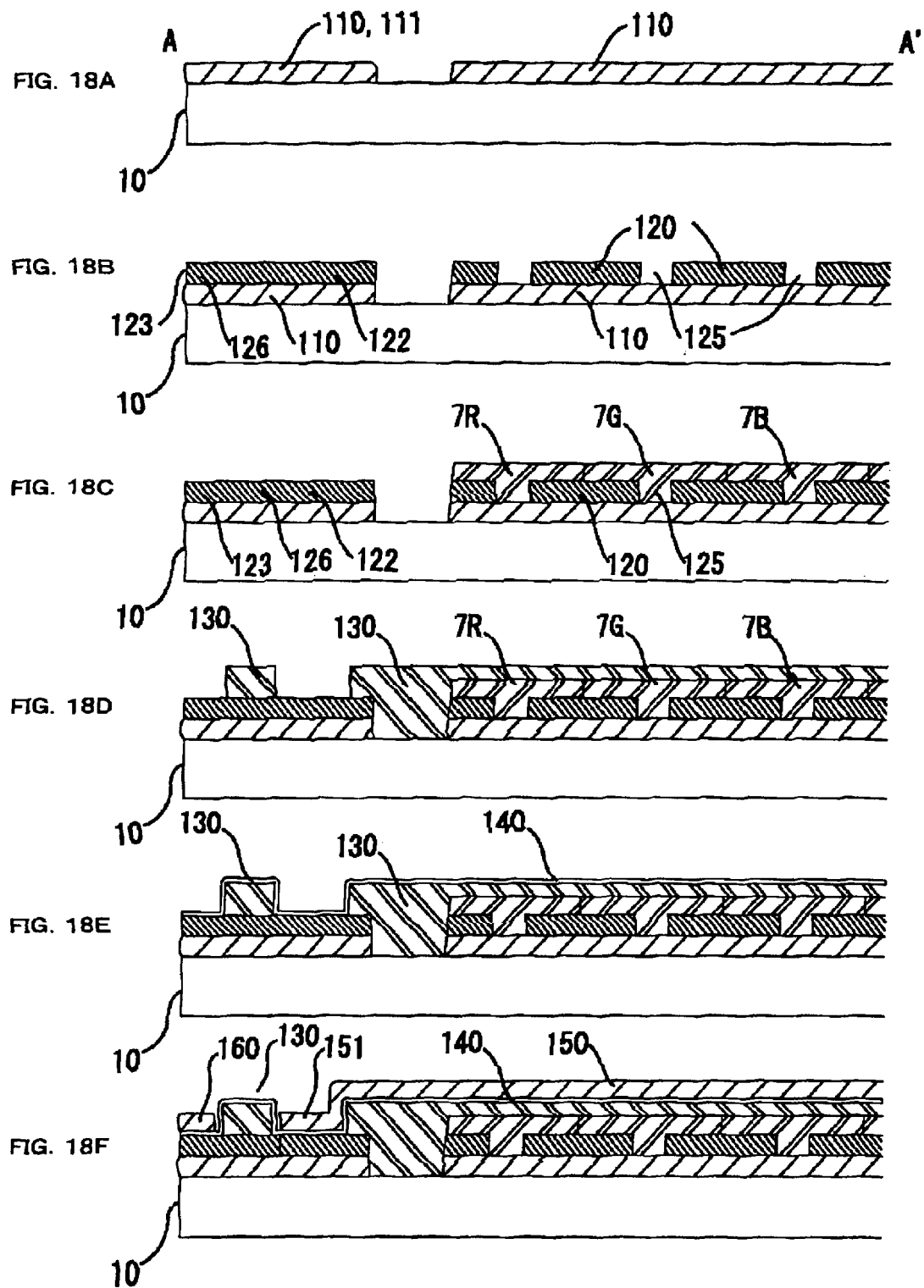

ELECTRO-OPTIC APPARATUS INCLUDING REFLECTION FILM WITH TRANSMISSION HOLES AND WIRING PATTERNS FORMED OF SAME METAL FILM AS REFLECTION FILM

BACKGROUND OF THE INVENTION

1. Technical Field

The present invention relates to electro-optic apparatuses in which an electro-optic material is held between a pair of substrates, and electronic units using the electro-optic apparatuses.

2. Related Art

Among various electro-optic apparatuses, electro-optic apparatuses using liquid crystal as an electro-optic material include a first substrate, a second substrate attached to the first substrate with a predetermined gap disposed therebetween by a sealing member, and an electro-optic-material layer held in an area partitioned by the sealing member within the gap, and first transparent driving electrodes and second transparent driving electrodes formed on the first substrate and the second substrate, respectively, apply an electric field to the electro-optic-material layer.

In such an electro-optic apparatus, when a back-light apparatus is disposed at the rear surface side of the first substrate, optical modulation is applied to light emitted from the back-light apparatus while the light passes through the electro-optic-material layer, to display a predetermined image in transmission mode. When an optical reflection film is formed at a lower layer side of the first driving electrodes at the first substrate, since optical modulation can be applied during the period in which external light incident from the second substrate side is reflected by the optical reflection film and output from the second substrate, an image can be displayed in reflection mode.

In transflective electro-optic apparatuses, light transmission holes are formed in an optical reflection film formed at a lower-layer side of first driving electrodes, and a back-light apparatus is disposed at the rear-surface side of a first substrate. Transmission-mode display is performed at an area where the light transmission holes are formed, and reflection-mode display is performed at an area where the light transmission holes are not formed.

In addition, when a color filter is formed in a second substrate at a zone which covers an area where the first driving electrodes face second driving electrodes, a color image can be displayed.

To perform such display operations, predetermined signals need to be sent to the first driving electrodes and the second driving electrodes. To this end, a driving IC needs to be mounted on each of the first substrate and the second substrate, or a flexible substrate on which a driving IC is mounted needs to be mounted on each of the first substrate and the second substrate. With this structure, since two driving ICs are required, and in addition, a mounting region extending over the other substrate needs to be obtained for each of the first substrate and the second substrate, a wide region is required at an outer side of an image area of the electro-optic apparatus.

Therefore, a structure has been employed in which mounting terminals formed at an extending region over the second substrate, first inter-substrate electrical-connection terminals formed at an area where the first substrate and the second substrate overlap, first wiring patterns for connecting mounting terminals to the first driving electrodes, and second wiring patterns for connecting mounting terminals to the first inter-substrate electrical-connection terminals are provided for the first substrate, and second inter-substrate electrical-connection terminals facing the first inter-substrate electrical-connection terminals are provided for the second substrate.

In the first substrate, conventionally, transparent electrically conductive films, such as an ITO film which forms the first driving electrodes, are used for the mounting terminals, the first inter-substrate electrical-connection terminals, the first wiring patterns for connecting mounting terminals to the first driving electrodes, and the second wiring patterns for connecting mounting terminals to the first inter-substrate electrical-connection terminals.

In the first substrate, however, when the second wiring patterns, which are long and extend from mounting terminals to the first inter-substrate electrical-connection terminals, are made from only the ITO film which forms a transparent electrically-conductive film constituting the first driving electrodes, the electrical resistance thereof becomes very large.

When a color filter layer is formed at the second substrate in transflective electro-optic apparatuses, since the color filter layer is formed at a flat area, the thickness of the color filter layer is the same between the transmission display area where light transmission holes are formed and the reflection display area where the light transmission holes are not formed. Therefore, a problem occurs in display color images, in which reflection-mode colors are deep whereas transmission-mode colors are light. This is because transmission display light passes through the color filter layer only once whereas reflection display light passes the color filter layer twice, once at input and once at output.

The present invention has been made in consideration of the above situations. An object of the present invention is to provide an electro-optic apparatus using inter-substrate electrical connections, and an electronic unit using the electro-optic apparatus both of which have reduced wiring resistance and have a structure that can solve the problem in which reflection-mode colors are deep whereas transmission-mode colors are light in images displayed in both transmission mode and reflection mode.

SUMMARY

To solve the above-described problem, according to the present invention, an electro-optic apparatus includes a first substrate, a second substrate attached to the first substrate with a predetermined gap disposed therebetween by a sealing member, and an electro-optic-material layer held in an area partitioned by the sealing member within the gap, wherein first transparent driving electrodes and second transparent driving electrodes formed on the first substrate and the second substrate, respectively, apply an electric field to the electro-optic-material layer. The first substrate includes mounting terminals formed at an extending area over the second substrate, first inter-substrate electric-connection terminals formed at an area where the first substrate and the second substrate overlap, first wiring patterns connecting mounting terminals to first driving electrodes, and second wiring patterns connecting mounting terminals to first inter-substrate electric-connection terminals. The second substrate includes second inter-substrate electric-connection terminals opposed to the first inter-substrate electric-connection terminals. An optical reflection film in which light transmission holes are formed at part of an area overlapping with an area where the first driving electrodes and the second driving electrodes are opposed is formed at a lower-layer side of the first driving electrodes in the first substrate, a color filter layer is formed between the optical reflection film and the first driving electrodes, and the second wiring patterns have metal wiring at least partially formed of the same metal film as in the optical reflection film.

In the present invention, since the second wiring patterns, which connect the mounting terminals to the first inter-substrate electric-connection terminals over a long distance, are formed of the metal film constituting the optical reflection film, the wiring resistance is small. In addition, the color filter layer is formed between the optical reflection film and the first driving electrodes, and the optical reflection film has the light transmission holes at the lower-layer side of the color filter layer. Therefore, the color filter layer formed at the optical transmission holes, used for transmission-mode display, is thicker than the color filter layer formed at the other area, used for reflection-mode display. Therefore, even when transmission display light passes through the color filter layer only once, and reflection display light passes through the color filter layer twice, once at input and once at output, a problem in which reflection-mode display is deeper in color than transmission-mode display when both modes are used does not occur. Thus, high-quality display is implemented.

In the present invention, the mounting terminals and the first inter-substrate electric-connection terminals are formed, for example, of a transparent electrically-conductive film constituting the first driving electrodes.

In the present invention, it is preferred that, between the color filter layer and the first driving electrodes, a transparent organic insulating film be formed at an area except at least at areas where the first inter-substrate electric-connection terminals and the mounting terminals are formed, and an inorganic insulating film be formed over almost the whole of the first substrate between the organic insulating film and the first driving electrodes. When the color filter layer is formed, unevenness occurs at the surface. As a result, the thickness of the electro-optic-material layer fluctuates, and alignment control thereof tends to be disturbed. When the organic insulating film is formed at the upper layer of the color filter layer as a flattening film, such problems are avoided. To form the first driving electrodes, after a transparent electrically-conductive film is formed over the entire substrate, patterning is performed with the use of photolithography technology. Since etching speed differs between the transparent electrically-conductive film formed on the organic insulating film and the transparent electrically-conductive film formed at the area where the organic insulating film is not formed, etching precision is reduced. In the present embodiment, however, since the inorganic insulating film is formed over the entire substrate at an upper layer of the organic insulating film, the etching speed for the transparent electrically-conductive film is the same over the entire substrate. Therefore, even when the organic insulating film is formed, the first driving electrodes can be etched at a high precision.

In the present invention, the metal wiring for the first wiring patterns and the second wiring patterns is disconnected at an area exposed from an edge of the second substrate. When this structure is made, problems, such as corrosion of metal wiring, do not occur at the area exposed from the edge of the second substrate, when patterning is applied to the first driving electrodes by etching at the upper-layer side of the metal wiring, or after the electro-optic apparatus has been manufactured.

In the present invention, it is preferred that, when the metal wiring for the first wiring patterns and the second wiring patterns is formed also at an area exposed from the edge of the second substrate, the organic insulating film be formed at an upper-layer side of the metal wiring at the exposed area. When this structure is made, since the metal wiring is protected by the organic insulating film at the area exposed from the edge of the second substrate, a problem such as corrosion does not occur when patterning is applied to the first driving electrodes by etching at the upper-layer side of the metal wiring, or after the electro-optic apparatus has been manufactured.

In the present invention, the first wiring patterns extend, in an area where the mounting terminals are formed, from mounting terminals arranged at a center area thereof toward an opposed substrate side to connect to the first driving electrodes, the second wiring patterns extend, in the area where the mounting terminals are formed, from mounting terminals arranged at both-side areas thereof, outside the area where the first wiring patterns are formed, to connect to the first inter-substrate electric-connection terminals arranged along substrate sides at both-side areas of an image display area, and the second driving electrodes extend in a direction intersecting with the first driving electrodes in the image display area to connect to the second inter-substrate electric-connection terminals.

In the present invention, it is preferred that a base electrically-conductive film be formed at a lower-layer side of an area where at least the metal film constituting the optical reflection film is formed. When this structure is made, since the metal film is formed above the substrate through the base electrically-conductive film, even if the close contact between the metal film and the substrate is low, defects, such as a reduced patterning precision or peeling off, do not occur.

In the present invention, it is preferred that an electrically-conductive protection film be formed at an upper layer of an area where the metal film constituting the optical reflection film is formed. When this structure is made, burning used when the color filter layer is formed does not cause deterioration of the surface of the optical reflection film.

In the present invention, it is preferred that holes be formed in the base electrically-conductive film at areas overlapping with the light transmission holes. When this structure is made, the color filter layer formed at the light transmission holes, used for transmission-mode display, is thicker than the color filter layer formed at the other area, used for reflection-mode display. Therefore, even when transmission display light passes through the color filter layer only once, and reflection display light passes through the color filter layer twice, once at input and once at output, a problem in which reflection-mode display is deeper in color than transmission-mode display when both modes are used does not occur. Thus, high-quality display is implemented.

In the present invention, it is preferred that the base electrically-conductive film be formed at a lower-layer side of the mounting terminals and at a lower-layer side of the first inter-substrate electric-connection terminals.

In the present invention, the optical reflection film for which the base electrically-conductive film is formed is made, for example, from a silver alloy film. Alternatively, the optical reflection film used is an aluminum alloy film or an aluminum film.

The optical reflection film may have a two-laminated-layer structure in which an aluminum alloy film or an aluminum film serves as the upper layer, and a molybdenum film or a molybdenum alloy film serves as the lower layer serving as an intermediate layer between the upper layer and the base electrically-conductive film.

In the present invention, it is preferred that the metal film constituting the optical reflection film be formed at a lower-layer side of the mounting terminals and the first inter-substrate electric-connection terminals.

In the present invention, when the base electrically-conductive film, or the metal film constituting the optical reflection film is also formed at the mounting terminals and the first inter-substrate electric-connection terminals, it is preferred that the mounting terminals and bumps for a driving IC be electrically connected through electrically-conductive particles scattered in a resin component, and the electrically-conductive particles pass through the inorganic insulating film formed at a lower-layer side of the mounting terminals. When this structure is made, if bumps for the driving IC are mounted to the mounting terminals, since the electrically-conductive particles pass through the inorganic insulating film in the mounting terminals, the bumps for the driving IC are electrically connected to the metal film and the base electrically-conductive film formed at the mounting terminals.

In the same way, when the base electrically-conductive film, or the metal film constituting the optical reflection film is also formed at the mounting terminals and the first inter-substrate electric-connection terminals, it is preferred that the first inter-substrate electric-connection terminals and the second inter-substrate electric-connection terminals be electrically connected through electrically-conductive particles scattered in a resin component, and the electrically-conductive particles pass through the inorganic insulating film formed inside the first inter-substrate electric-connection terminals.

When this structure is made, if the first inter-substrate electric-connection terminals and the second inter-substrate electric-connection terminals are connected, since the electrically-conductive particles pass through the insulating film inside the first inter-substrate electric-connection terminals, the first inter-substrate electric-connection terminals are electrically connected to the metal film and the base electrically-conductive film formed at a lower-layer side thereof.

An electro-optic apparatus according to the present invention is used, for example, as a display section of an electronic unit.

BRIEF DESCRIPTION OF THE DRAWINGS

FIG. 5 is a view showing elements formed at the first substrate and a second substrate used in the electro-optic apparatus shown in FIG. 1.

FIG. 6(A) to FIG. 6(F) are process sectional views showing a manufacturing method of the first substrate used in the electro-optic apparatus shown in FIG. 1, correspondingly to FIG. 4(A).

FIG. 11(A) to FIG. 11(F) are process sectional views showing a manufacturing method of the first substrate used in the electro-optic apparatus shown in FIG. 8, correspondingly to FIG. 8(B).

FIG. 14(A) to FIG. 14(F) are process sectional views showing a manufacturing method of the first substrate used in the electro-optic apparatus shown in FIG. 12, correspondingly to FIG. 12(A).

FIG. 18(A) to FIG. 18(F) are process sectional views showing a manufacturing method of the first substrate used in the electro-optic apparatus shown in FIG. 16, correspondingly to FIG. 16(A).

DETAILED DESCRIPTION

Embodiments of the present invention will be described below by referring to the attached drawings.

First Embodiment

Entire Structure

Figure 1:
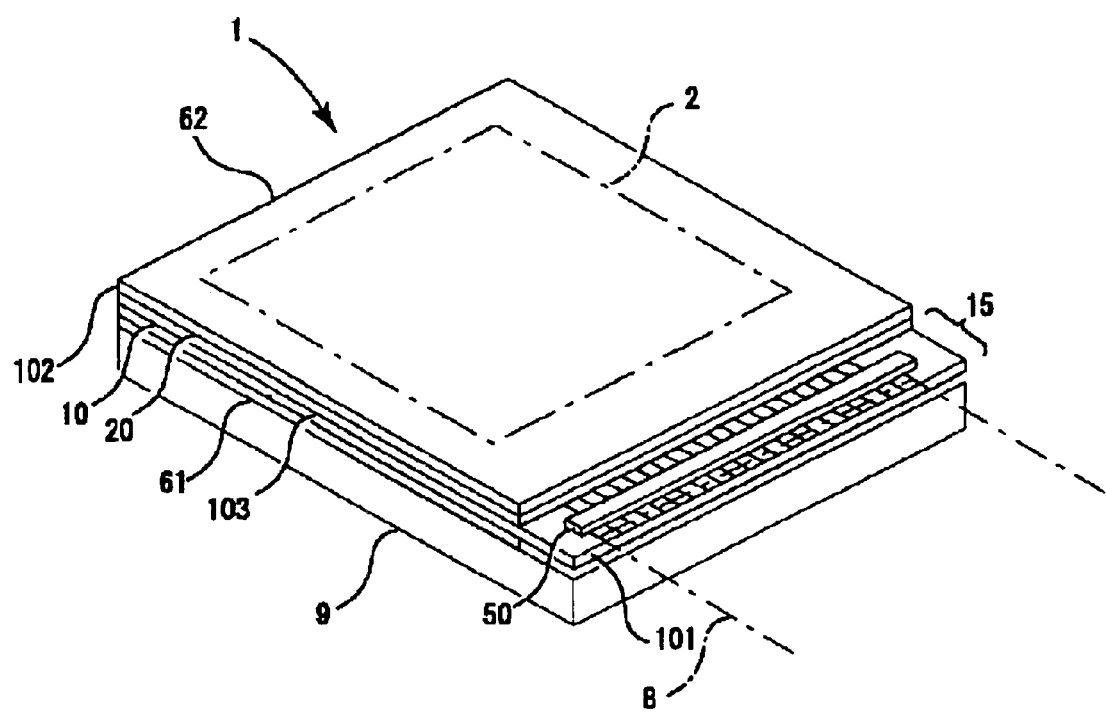
FIG. 1 is a perspective view of an electro-optic apparatus according to a first embodiment of the present invention.
Figure 2:
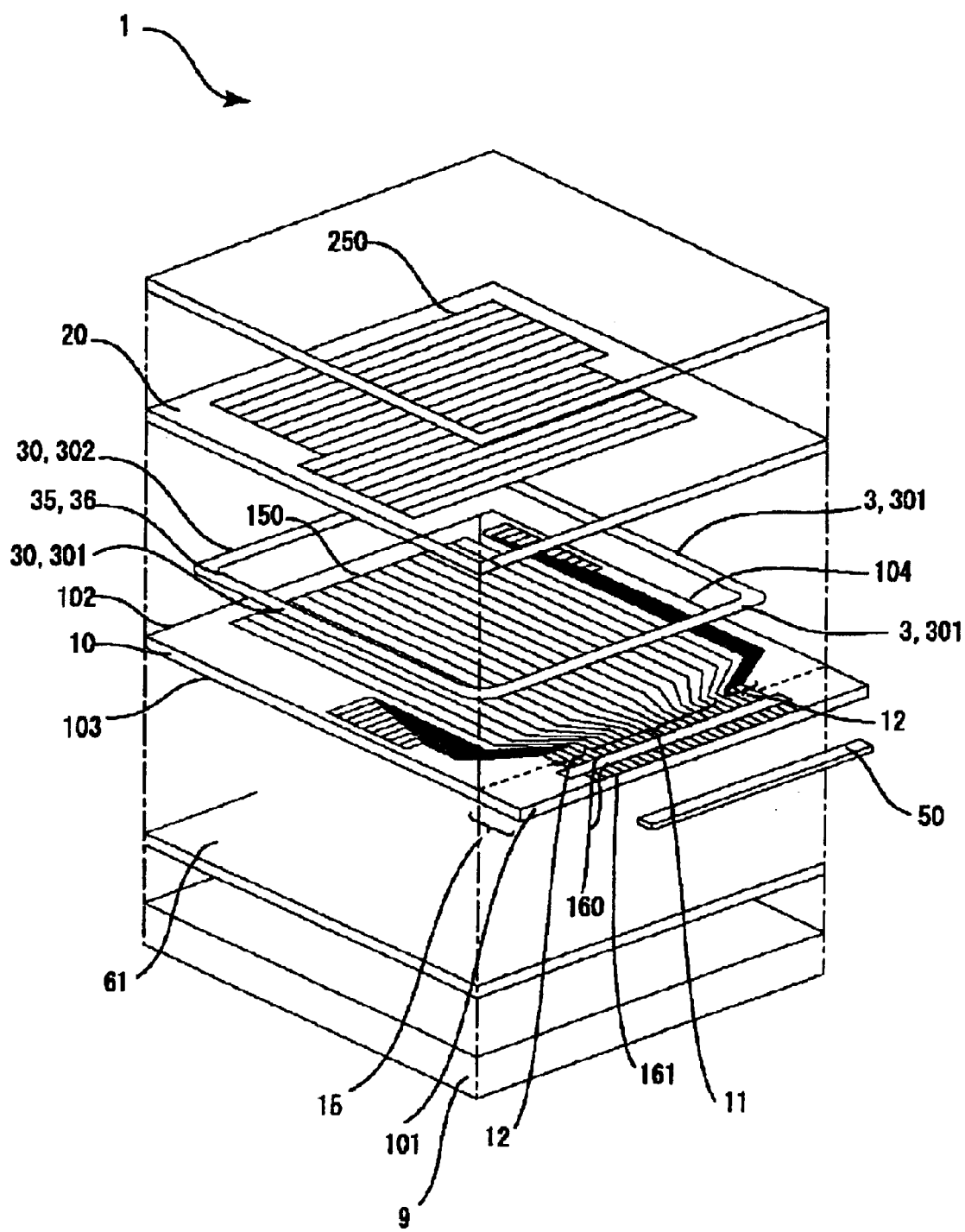
FIG. 2 is an exploded perspective view of the electro-optic apparatus shown in FIG. 1.

FIG. 1 and FIG. 2 are a perspective view of an electro-optic apparatus according to a first embodiment of the present invention and an exploded perspective view thereof, respectively. In these figures and other figures described below, to make layers and members have recognizable sizes, they are shown at different scales and the quantities thereof are different.

In FIG. 1 and FIG. 2, in the electro-optic apparatus 1 of the present embodiment, a liquid-crystal sealing area 35 is partitioned by a sealing member 30 between a pair of transparent substrates made from rectangular glasses or others and attached by the sealing member 30 with a predetermined gap disposed therebetween, and liquid crystal serving as an electro-optic material is sealed in the liquid-crystal sealing area 35 to form a liquid-crystal layer 36 (electro-optic-material layer). Of the pair of transparent substrates, a substrate in which a plurality of lines of first driving electrodes 150 extending in a longitudinal direction is formed in an image display area 2 is called a first substrate 10, and a substrate in which a plurality of lines of second driving electrodes 250 extending in a transverse direction is formed in the image display area 2 is called a second substrate 20.

In the electro-optic apparatus 1 shown here, a polarizing plate 61 is attached to the outside surface of the first substrate 10, and a polarizing plate 62 is attached to the outside surface of the second substrate 20. In addition, a back-light apparatus 9 is disposed at the outside of the first substrate 10.

In the electro-optic apparatus 1 structured in this way, the first substrate 10 has the same width as the second substrate 20, but is longer than the second substrate 20.

Therefore, when the first substrate 10 and the second substrate 20 are attached, an end of the first substrate 10 extends from a substrate side 201 of the second substrate 20, and in that extending area 15, mounting terminals 160 to which a driving IC 50 is to be mounted are formed along a substrate side 101. In the extending area 15, mounting terminals 161 to which a flexible substrate 8 is to be mounted are also formed along the substrate side 101.

From mounting terminals 160 arranged at a center area among the mounting terminals 160 to which the driving IC 50 is to be mounted, first wiring patterns 11 extend toward the opposed substrate side 101 to connect to the first driving electrodes 150.

In the first substrate 10, at both sides of the image display area 2, first inter-substrate electrical-connection terminals 170 are arranged along substrate sides 103 and 104 at an area where the first substrate 10 and the second substrate 20 overlap. From mounting terminals 160 arranged at both-side areas among the mounting terminals 160 to which the driving IC 50 is to be mounted, second wiring patterns 12 extend outside of an area where the first wiring patterns 11 are formed, to connect to the first inter-substrate electrical-connection terminals 170.

In contrast, in the second substrate 20, the second driving electrodes 250 extend in the transverse direction in the image display area 2, and the ends of the second driving electrodes 250 serve as second inter-substrate electrical-connection terminals 270 which overlap with the first inter-substrate electrical-connection terminals 170.

Layer Structure on Substrates

The structure of the electro-optic apparatus structured in this way will be described in detail by referring to FIG. 3, FIG. 4(A), and FIG. 4(B).

Figure 3:
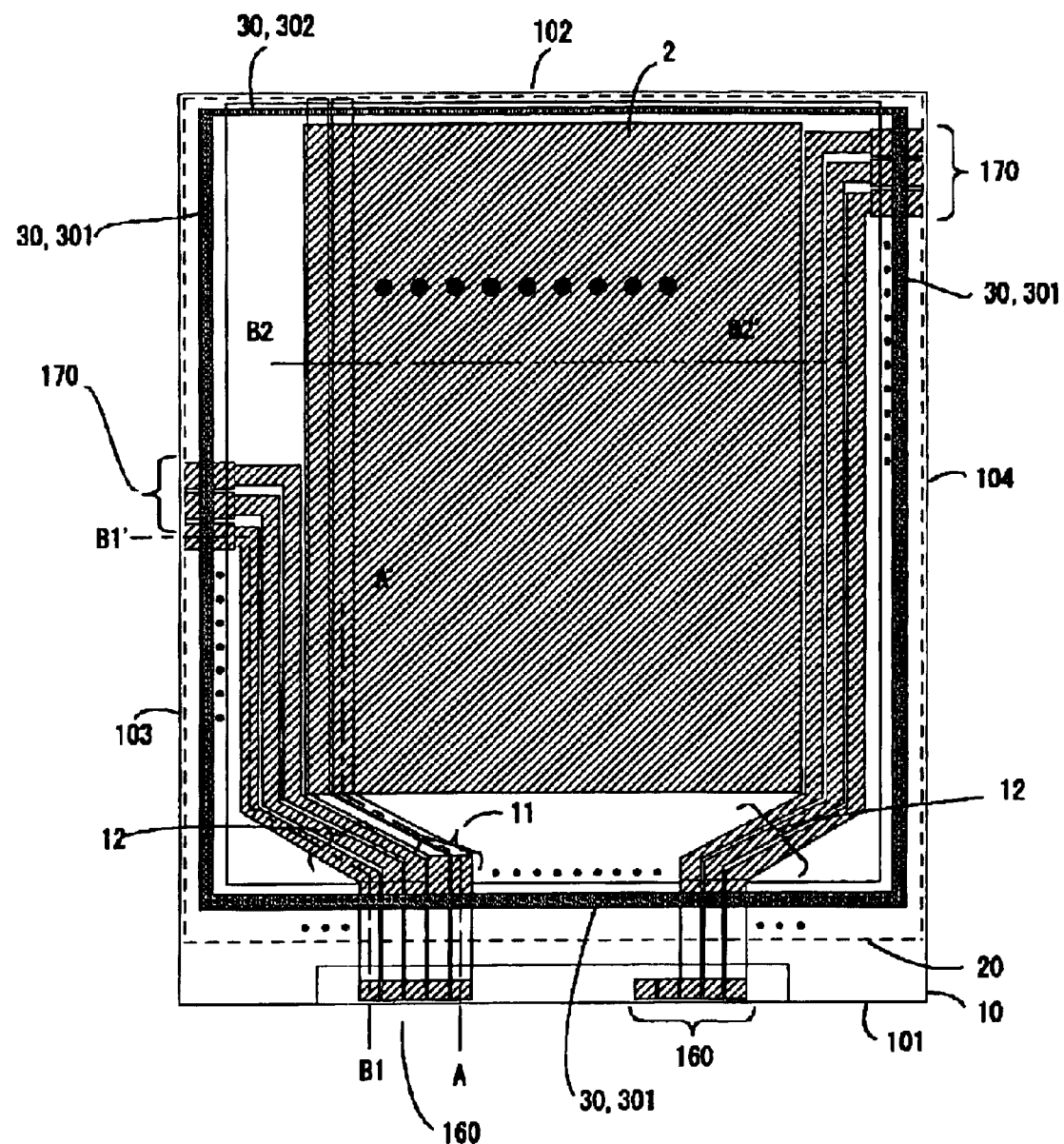
FIG. 3 is a plan showing the structure of a first substrate used in the electro-optic apparatus shown in FIG. 1, in a sketch manner.

FIG. 3 is a plan showing the structure of the first substrate used in the electro-optic apparatus shown in FIG. 1, in a sketch manner. FIG. 4(A) and FIG. 4(B) are a cross-sectional view of the electro-optic apparatus taken on line A–A' shown in FIG. 3, and a cross-sectional view of the electro-optic apparatus taken on lines B1–B1' and B2–B2' shown in FIG. 3, respectively.

Figure 4A:
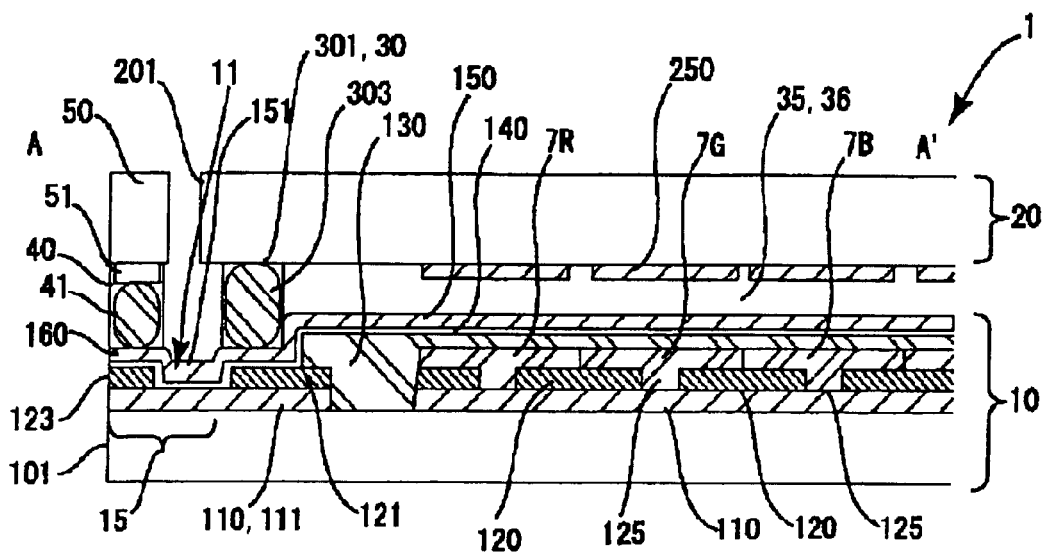
FIG. 4(A) and FIG. 4(B) are a cross-sectional view of the electro-optic apparatus taken on line A–A' shown in FIG. 3, and a cross-sectional view of the electro-optic apparatus taken on lines B1–B1' and B2–B2' shown in FIG. 3, respectively.
Figure 4B:
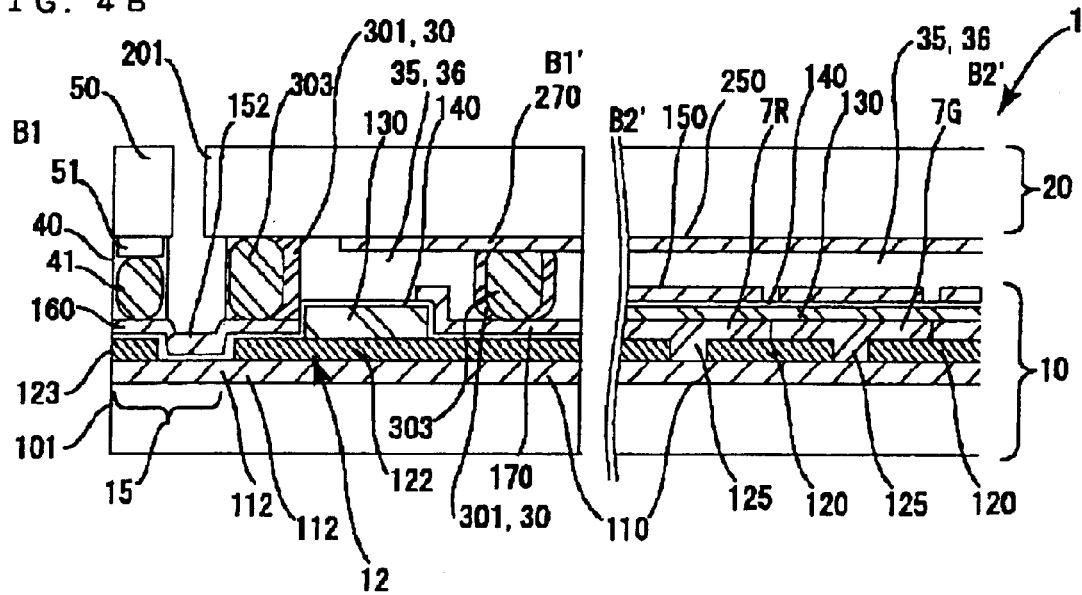

In FIG. 3, FIG. 4(A), and FIG. 4(B), a base electrically conductive film 110 made from an ITO film, an optical reflection film 120 made from a silver alloy or others, a color filter layer 7R, 7G, and 7B, an organic insulating film 130 serving as a flattening film, an inorganic insulating film 140 made from a silicon oxide film, the first driving electrodes 150 made from an ITO film, and an alignment film (not shown) are formed in that order from a lower layer side to an upper layer side in the first substrate 10.

In contrast, the second driving electrodes 250 and an alignment film (not shown) are formed in that order in the second substrate 20.

The first substrate 10 and the second substrate 20 are attached by the sealing member 30 in which gap members (i.e., gap controlling members) are mixed with a resin component. The sealing member 30 is formed so as to partition the image display area 2, and the electro-optic-material layer 36 is held at the inside thereof.

As the sealing member 30, a sealing member 301 with electrically-conductive particles, in which gap members and electrically-conductive particles are mixed with a resin component, and a sealing member 302 in which gap members are mixed with a resin component are used. The sealing member 301 with electrically-conductive particles is applied to three sides, the two substrate sides 103 and 104 where the first inter-substrate electrical-connection terminals 170 are formed, and one side at the side of the extending area 15, on which the substrate side 201 of the second substrate 20 is placed.

In the first substrate 10 of the electro-optic apparatus structured in this way, the base electrically-conductive film 110 is formed at a lower-layer side of the optical reflection layer 120 in the image display area 2 as a plane, is also formed at a lower-layer side of the mounting terminals 160, and extends from the lower-layer side of the mounting terminals 160 to a position above which the second substrate 20 is placed, as the lowest-layer wiring 111 of the first wiring patterns 11. The base electrically-conductive film 110 also extends from the lower-layer side of the mounting terminals 160 to a lower-layer side of the first inter-substrate electrical-connection terminals 170, as the lowest-layer wiring 112 of the second wiring patterns 12.

The optical reflection layer 120 formed on the base electrically-conductive layer 110 is formed in the image display area 2 as a plane. At pixels where the first driving electrodes 150 are opposed to the second driving electrodes 250, a part of the optical reflection layer 120 is removed and light transmission holes 125 are formed.

In the first substrate 10, a metal film formed together with the optical reflection film 120 at the same time is formed at a lower-layer side of the mounting terminals 160 as base electrodes 123, and is also formed at an area above which the substrate side 201 of the second substrate 20 is placed, as base electrodes 121. The metal film formed together with the optical reflection film 120 at the same time extends to a lower-layer side of the first inter-substrate electrical-connection terminals 170 in the area where the first substrate 10 and the second substrate 20 overlap, as lower-layer wiring 122 of the second wiring patterns 12. The metal film formed together with the optical reflection film 120 at the same time is not formed at the extending area 15 of the first substrate 10, where the first substrate 10 is exposed from the substrate side 201 of the second substrate 20, and therefore, the metal film is disconnected in this area.

At the upper-layer side of the optical reflection layer 120, the R (red), G (green), and B (blue) color filter layer 7R, 7G, and 7B is formed in the image display area 2. The color filter layer 7R, 7G, and 7B is made by scattering color members in resin. In each pixel, the color filter layer is made thicker at an area where the optical reflection film 120 is removed and the light transmission hole 125 is formed, than at an area where the optical reflection film 120 is solidly formed.

At an upper layer of the color filter layer 7R, 7G, and 7B, the thick organic insulating film 130 is formed as a flattening film. The organic insulating film 130 is selectively formed in the image display area 2, and not formed at an outer peripheral side. More specifically, the organic insulating film 130 is formed at areas other than the mounting terminals 160 and the first inter-substrate electrical-connection terminals 170, and the area where the sealing member 30 is applied.

At an upper layer of the organic insulating film 130, the inorganic insulating film 140 made from a thin silicon oxide film is formed over the entire substrate.

At an upper layer of the inorganic insulating film 140, the first driving electrodes 150 made from an ITO film is formed in the image display area 2, and the mounting terminals 160 and the first inter-substrate electrical-connection terminals 170 are formed of an ITO film formed together with the first driving electrodes 150 at the same time.

The ITO film formed together with the first driving electrodes 150 at the same time extends from the mounting terminals 160 to the area where the first substrate 10 and the second substrate 20 overlap, as upper wiring 151 of the first wiring pattern 11, and therefrom, serves as the first driving electrodes 150. The ITO film formed together with the first driving electrodes 150 at the same time is formed at an area where the second substrate 20 is exposed, as upper-layer wiring 152 of the second wiring pattern 12, but is not formed at the area where the first substrate 10 and the second substrate 20 overlap, and is disconnected.

Manufacturing Method

The structure of each substrate used in the electro-optic apparatus according to the present embodiment will be described further in detail by referring to FIG. 5, FIG. 6, and FIG. 7 while its manufacturing method will be also described.

FIG. 5(A) to FIG. 5(F) are views showing elements formed in the first substrate and the second substrate used in the electro-optic apparatus shown in FIG. 1. FIG. 6(A) to FIG. 6(F) and FIG. 7(A) to FIG. 7(F) are process sectional views showing a manufacturing method of the first substrate and the second substrate used in the electro-optic apparatus shown in FIG. 1. In the image display area shown in FIG. 5(B), FIG. 5(C), or FIG. 5(D), a plurality of pixels are enlarged in a rectangle and illustrated in a sketch manner.

As shown in FIG. 5(A), to manufacture the second substrate 20, an ITO film is formed over the entire substrate, and then, patterning is performed with the use of photolithography technology to form the second driving electrodes 250 (at hatched areas) extending in the transverse direction in the image display area 2. The second inter-substrate electrical-connection terminals 270 are formed by ends of second driving electrodes 250.

Figure 7A:
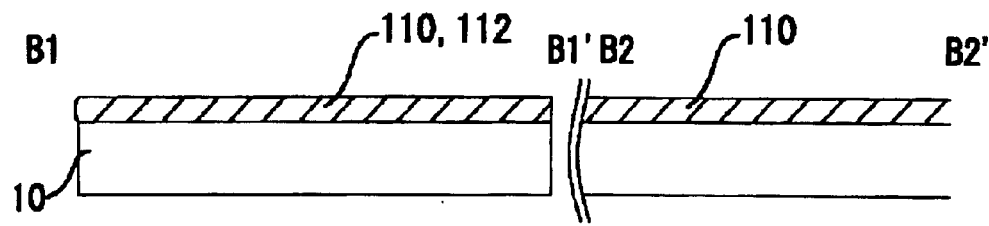
FIG. 7(A) to FIG. 7(F) are process sectional views showing a manufacturing method of the first substrate used in the electro-optic apparatus shown in FIG. 1, correspondingly to FIG. 4(B).

In contrast, to manufacture the first substrate 10, as shown in FIG. 5(B), FIG. 6(A), and FIG. 7(A), an ITO film is formed on the entire substrate, and then patterning is performed with the use of photolithography technology to form the base electrically-conductive film 110 (at a hatched area in FIG. 5(B)) in the image display area 2 as a rectangular plane area. The base electrically-conductive film 110 is also formed at the area where the mounting terminals 160 are to be formed, and is left from the lower-layer side of the mounting terminals 160 to the area where the first substrate 10 and the second substrate 20 overlap, as the lowest-layer wiring 111 of the first wiring patterns 11. The base electrically-conductive film 110 is also left from the lower-layer side of the mounting terminals 160 to the lower-layer side of the first inter-substrate electrical-connection terminal 170, as the lowest-layer wiring 121 of the second wiring patterns 12.

Figure 7B:
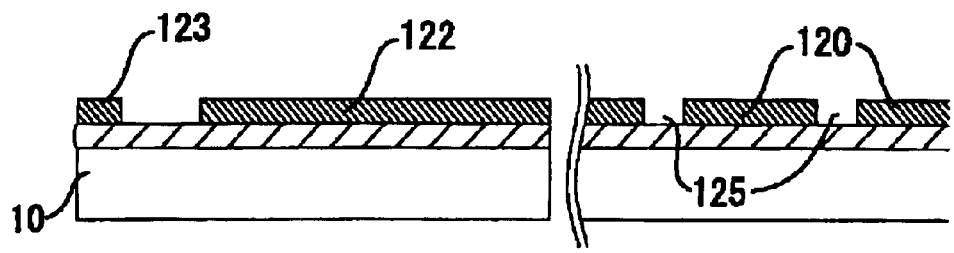

Then, as shown in FIG. 5(C), FIG. 6(B), and FIG. 7(B), after the metal film made from a silver alloy film or others is formed at an upper layer of the base electrically-conductive film 110, patterning is performed with the use of photolithography technology to form the optical reflection film 120 (at a hatched area in FIG. 5(C)) in the image display area 2 in a plane manner. The optical reflection film 120 is removed at a part of the area where the first driving electrodes 150 are opposed to the second driving electrodes 250, to form the light transmission holes 125.

The metal film formed together with the optical reflection film 120 at the same time is left at the lower-layer side of the area where the mounting terminals 160 are to be formed, as the base electrodes 123, and also left at the area where the substrate side 201 of the second substrate 20 is placed, as the base electrodes 121. The metal film formed together with the optical reflection film 120 at the same time is also left at the area where the first substrate 10 and the second substrate 20 overlap, as the lower-layer wiring 122 of the second wiring patterns 12, to the lower-layer side of the first inter-substrate electrical-connection terminals 170. The metal film formed together with the optical reflection film 120 at the same time is removed at the extending area 15 of the first substrate 10, where the first substrate 10 is exposed from the substrate side 201 of the second substrate 20.

At a lower-layer side of the metal film constituting the optical reflection film 120, the base electrically-conductive film 110 is formed. Therefore, since the metal film constituting the optical reflection film 120 is made from a silver alloy film, even if the close contact between the metal film and the substrate is low, defects, such as a reduced patterning precision or peeling off of the optical reflection film 120, do not occur.

Figure 7C:
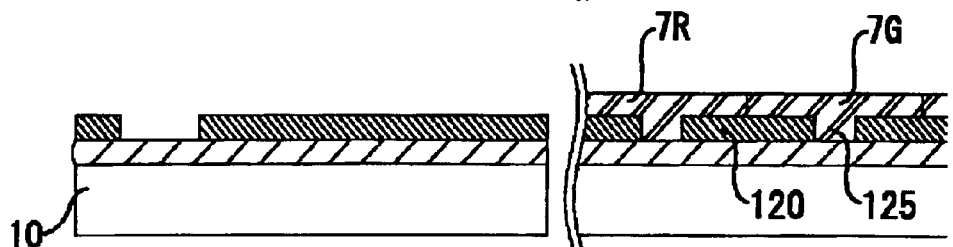

Then, as shown in FIG. 5(D), FIG. 6(C), and FIG. 7(C), at the upper-layer side of the optical reflection film 120, the R (red), G (green), and B (blue) color filter layer 7R, 7G, and 7B are formed at a predetermined position (the hatched area) in the image display area 2. The color filter layer 7R, 7G, and 7B is made by scattering color members in resin. In each pixel, the color filter layer is made thicker at an area where the optical reflection film 120 is removed and the light transmission hole 125 is formed, than at an area where the optical reflection film 120 is formed.

Figure 7D:
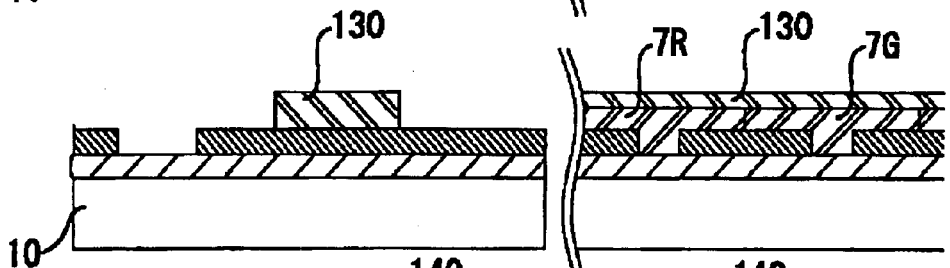

Then, as shown in FIG. 5(E), FIG. 6(D), and FIG. 7(D), after the thick organic insulating film 130 is formed at the upper layer of the color filter layer 7R, 7G, and 7B, patterning is performed with the use of photolithography technology to selectively leave the organic insulating film 130 (at the hatched area) in the image display area, and not to leave it at the outer peripheral side thereof. As a result, the organic insulating film 130 is formed at areas other than the mounting terminals 160 and the first inter-substrate electrical-connection terminals 170, and the areas where the sealing member 30 is applied.

Figure 7E:
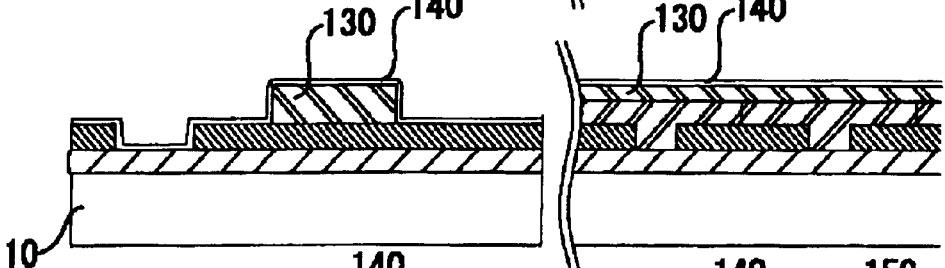

Then, as shown in FIG. 6(E) and FIG. 7(E), at the upper layer of the organic insulating film 130, the inorganic insulating film 140 made from thin silicon oxide film is formed over the entire substrate.

Figure 7F:
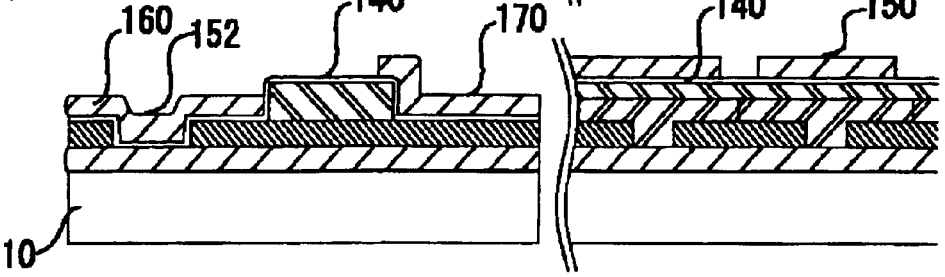

Next, as shown in FIG. 5(F), FIG. 6(F), and FIG. 7(F), after an ITO film is formed over the entire substrate at an upper layer of the inorganic insulating film 140, patterning is performed with the use of photolithography technology to form the first driving electrodes 150 (at the hatched area) in the image display area 2. The ITO film formed together with the first driving electrodes 150 at the same time is left as the mounting terminals 160 and the first inter-substrate electrical-connection terminals 170.

The ITO film formed together with the first driving electrodes 150 at the same time is also left from the mounting terminals 160 to the area where the first substrate 10 and the second substrate 20 overlap, as the upper-layer wiring 151 of the first wiring patterns 11, and therefrom, is connected to the first driving electrodes 150. The ITO film formed together with the first driving electrodes 150 at the same time is further formed as the upper-layer wiring 152 of the second wiring patterns 12 at the area exposed from the substrate side 201 of the second substrate 20, but removed from the area where the first substrate 10 and the second substrate 20 overlap.

When such etching is performed, since the silver alloy film constituting the optical reflection film 120 is not exposed, etchant for the ITO film does not etch the silver alloy film constituting the optical reflection film 120.

IC Mounting Structure and Inter-substrate Electrical-connection Structure

The driving IC 50 is mounted to the mounting terminals 160 connected to the upper-layer wiring 151 and 152 of the first wiring patterns 11 and the second wiring patterns 12 by an anisotropic electrically-conductive film 40 in which electrically-conductive particles 41 are mixed with a resin component. At the lower-layer side of the mounting terminals 160, the thin inorganic insulating film 140 formed of a silicon oxide film is formed. At the lower-layer side thereof, the base electrodes 123 formed of the metal film formed together with the optical reflection film 120 at the same time, and the base electrically-conductive film 110 are formed. Therefore, when the driving IC 50 is connected to the first substrate 10 by thermocompression bonding through the anisotropic electrically-conductive film 40, since a film exists at the lower-layer side, the electrically-conductive particles 41 pass through the inorganic insulating film 140 due to the pressure of the compression bonding, so that the mounting terminals 160 are electrically connected to the base electrodes 123 formed of the metal film formed together with the optical reflection film 120 at the same time, and are also electrically connected to the lowest-layer wiring 111 and 112 of the first wiring patterns 11 and the second wiring patterns 12 through the base electrodes 123.

The first substrate 10 and the second substrate 20 are attached by the sealing member 30. The sealing member 301 with the electrically-conductive particles 303 is applied to the area where the first inter-substrate electrical-connection terminals 170 are formed along the two substrate sides 103 and 104 and to the area where the substrate side 201 of the second substrate 20 is placed near the extending area 15.

Therefore, the first substrate 10 and the second substrate 20 are connected by thermocompression bonding through the sealing member 30 which includes the electrically-conductive particles 303 at the area where the substrate side 201 of the second substrate 20 is placed near the extending area 15. The inorganic insulating film 140 is formed at the lower-layer side of the upper-layer wiring 151 of the first wiring patterns 11. At the lower-layer side of the inorganic insulating film 140, the base electrodes 121 formed of the metal film formed together with the optical reflection film 120 at the same time are formed. At the lower-layer side of the base electrodes 121, the lowest-layer wiring 111 of the first wiring patterns 11, formed of the base electrically-conductive film 110 is formed. Therefore, when the first substrate 10 and the second substrate 20 are connected by thermocompression bonding through the sealing member 301, since a film exists at the lower-layer side, the electrically-conductive particles 303 pass through the inorganic insulating film 140 due to the pressure of the compression bonding, so that the upper-layer wiring 151 of the first wiring patterns 11 is electrically connected to the base electrodes 121. As a result, the upper-layer wiring 151 of the first wiring patterns 11 is electrically connected to the lowest-layer wiring 111 of the first wiring patterns 11 through the base electrodes 121.

Therefore, even when the metal wiring formed together with the optical reflection film 120 at the same time is disconnected at the area exposed from the substrate side of the second substrate 20, the wiring resistance of the first wiring patterns 11 is small at this area.

In the same way, before the first substrate 10 and the second substrate 20 are connected by thermocompression bonding through the sealing member 301 which includes the electrically-conductive particles 303 at the area where the substrate side 201 of the second substrate 20 is placed near the extending area 15, the inorganic insulating film 140 is formed at the lower-layer side of the upper-layer wiring 152 of the second wiring patterns 12. At the lower-layer side of the inorganic insulating film 140, the lower-layer wiring 122 of the second wiring patterns 12, made from the metal film formed together with the optical reflection film 120 at the same time is formed. At the lower-layer side of the lower-layer wiring 122, the lowest-layer wiring 112 of the second wiring patterns 12, formed of the base electrically-conductive film 110 is formed. Therefore, when the first substrate 10 and the second substrate 20 are connected by thermocompression bonding through the sealing member 301, the electrically-conductive particles 303 pass through the inorganic insulating film 140 due to the pressure of the compression bonding, so that the upper-layer wiring 152 of the second wiring patterns 12 is electrically connected to the lower-layer wiring 122 of the second wiring patterns 12, and is further electrically connected to the lowest-layer wiring 112 of the second wiring patterns 12 through the lower-layer wiring 122.

Therefore, even when the metal wiring formed together with the optical reflection film 120 at the same time is disconnected at the area exposed from the substrate side of the second substrate 20, the wiring resistance of the second wiring patterns 12 is small at this area.

Further, before the first substrate 10 and the second substrate 20 are connected by thermocompression bonding through the sealing member 30 which includes the electrically-conductive particles 303 at the area where the first inter-substrate electric-connection terminals 170 are formed, the inorganic insulating film 140 is formed at a lower-layer side of the first inter-substrate electric-connection terminals 170. At the lower-layer side of the inorganic insulating film 140, the lower-layer wiring 122 of the second wiring patterns 12 formed together with the optical reflection film 120 is formed at the same time. At the lower-layer side of the lower-layer wiring 122, the lowest-layer wiring 112 of the second wiring patterns 12, formed of the base electrically-conductive film 110 is formed. Therefore, when the first substrate 10 and the second substrate 20 are connected by thermocompression bonding through the sealing member 301, the electrically-conductive particles 303 pass through the inorganic insulating film 140 due to the pressure of the compression bonding, so that the first-substrate electric-connection terminals 170 are electrically connected to the lower-layer wiring 122 of the second wiring patterns 12, and are further electrically connected to the lowest-layer wiring 112 of the second wiring patterns 12 through the lower-layer wiring 122.

In the electro-optic apparatus 1 structured in this way, when the driving IC 50 outputs signals to the mounting terminals 160, the signals are sent from the mounting terminals 160 formed at the center area, to the first driving electrodes 150 through the first wiring patterns 11 provided with the upper-layer wiring 151 formed of the ITO film formed together with the first driving electrodes 150 at the same time, and the lowest-layer wiring 111 formed of the ITO film.

In contrast, when the driving IC 50 outputs signals to the mounting terminals 160 formed at both-side areas, the signals are sent from the mounting terminals 160 formed at both-side areas, through the upper-layer wiring 152 formed of the ITO film formed together with the first driving electrodes 150 at the same time, and the lowest-layer wiring 112 formed of the ITO film at the area where the second wiring patterns 12 are exposed from the substrate side 201 of the second substrate 20, and then, through the lower-layer wiring 122 of the second wiring patterns 12 formed together with the optical reflection film 120 at the same time, and the lowest-layer wiring 112 formed of the ITO film at the area where the first substrate 10 and the second wiring patterns 12 overlap, to the first inter-substrate electric-connection terminals 170. The signals sent to the first inter-substrate electric-connection terminals 170 are sent to the second driving electrodes 250 through the first inter-substrate electric-connection terminals 170, the electrically-conductive particles 303 included in the sealing member 301, and the second inter-substrate electric-connection terminals 270.

As a result, the alignment state of the liquid-crystal layer 36 positioned at the area where the first driving electrodes 150 are opposed to the second driving electrodes 250 is controlled in units of pixels. Therefore, optical modulation is applied to external light incident from the second substrate 20 side and which is reflected by the optical reflection film 120 and output from the second substrate 20 to display an image (in reflection mode). Since the optical reflection film 120 formed at the lower-layer side of the first driving electrodes 150 has the light transmission holes 125, optical modulation is applied to light emitted from the back-light apparatus 9 disposed at the rear-surface side of the first substrate 10, while it passes through the light transmission holes 125, is incident on the liquid-crystal layer 36, then is output from the second substrate 20 to display an image (in transmission mode).

Since the first substrate 10 is provided with the color filter layer 7R, 7G, and 7B at the area where the first driving electrodes 150 are opposed to the second driving electrodes 250, color images can be displayed.

Main Advantages Obtained by the Present Embodiment

As described above, since the second wiring patterns 12, which connect the mounting terminals 160 to the first inter-substrate electric-connection terminals 170 are formed of metal wire (lower-layer wiring 122) made from the metal film constituting the optical reflection film 120, the wiring resistance is small.

In the first substrate 10, the color filter layer 7R, 7G, and 7B is formed between the optical reflection film 120 and the first driving electrodes 150, and the optical reflection film 120 has the light transmission holes 125 at the lower-layer side of the color filter layer 7R, 7G, and 7B. Therefore, the color filter layer 7R, 7G, and 7B formed at the optical transmission holes 125, used for transmission-mode display, is thicker than the color filter layer 7R, 7G, and 7B formed at the other area, used for reflection-mode display.

Therefore, even when transmission display light passes through the color filter layer 7R, 7G, and 7B only once, and reflection display light passes through the color filter layer 7R, 7G, and 7B twice, once at input and once at output, a problem in which reflection-mode display is deeper in color than transmission-mode display when both modes are used does not occur. Thus, high-quality display is implemented.

Further, the organic insulating film 130 is formed between the color filter layer 7R, 7G, and 7B and the first driving electrodes 150. When the color filter layer 7R, 7G, and 7B is formed, unevenness occurs at the surface. As a result, the thickness of the liquid-crystal layer 36 fluctuates, and alignment control is disturbed. In the present embodiment, however, since the organic insulating film 130 is formed at the upper layer of the color filter layer 7R, 7G, and 7B as a flattening film, such problems are avoided.

To form the first driving electrodes 150, after an ITO film is formed over the entire substrate, patterning is performed with the use of photolithography technology. Since the close contact property between an ITO film and its base differs between an ITO film formed on the organic insulating film 130 and an ITO film formed at an area where the organic insulating film 130 is not formed, etching speed differs and etching precision is reduced. In the present embodiment, however, since the inorganic insulating film 140 is formed over the entire substrate at an upper layer of the organic insulating film 130, the close contact property between the ITO film and base is uniform over the entire substrate. Therefore, ITO-film etching speed is the same over the entire substrate. Accordingly, even when the organic insulating film 130 is formed at a lower-layer side, the first driving electrodes 150 can be etched with high precision.

Further, the base electrically-conductive film 110 or the metal film constituting the optical reflection film 120 is formed at a lower-layer side of the mounting terminals 160 and the first inter-substrate electric-connection terminals 170.

Therefore, when the bumps 51 for the driving IC 50 are mounted to the mounting terminals 160, since the electrically-conductive particles 41 pass through the inorganic insulating film 140 at the lower-layer side of the mounting terminals 160, the mounting terminals 160 are electrically connected to the metal film and the base electrically-conductive film 110 formed at the lower-layer side of the mounting terminals 160. When the first inter-substrate electric-connection terminals 170 are connected to the second inter-substrate electric-connection terminals 270, since the electrically-conductive particles 303 pass through the inorganic insulating film 140 at the lower-layer side of the first inter-substrate electric-connection terminals 170, the first inter-substrate electric-connection terminals 170 are connected to the metal film and the base electrically-conductive film 110 formed at the lower-layer side of the first inter-substrate electric-connection terminals 170.

Metal wiring, including the first wiring patterns 11 and the second wiring patterns 12, is disconnected at the area where the first substrate 10 is exposed from the edge of the second substrate 20. Therefore, problems, such as corrosion of metal wiring, do not occur at the area where the first substrate 10 is exposed from the substrate side 201 of the second substrate 20, after the optical reflection film 120 is formed, when patterning is applied to the first driving electrodes 150 by such as etching at the upper-layer side of the optical reflection film 120, or after the electro-optic apparatus 1 has been manufactured.

Second Embodiment

Figure 8A:
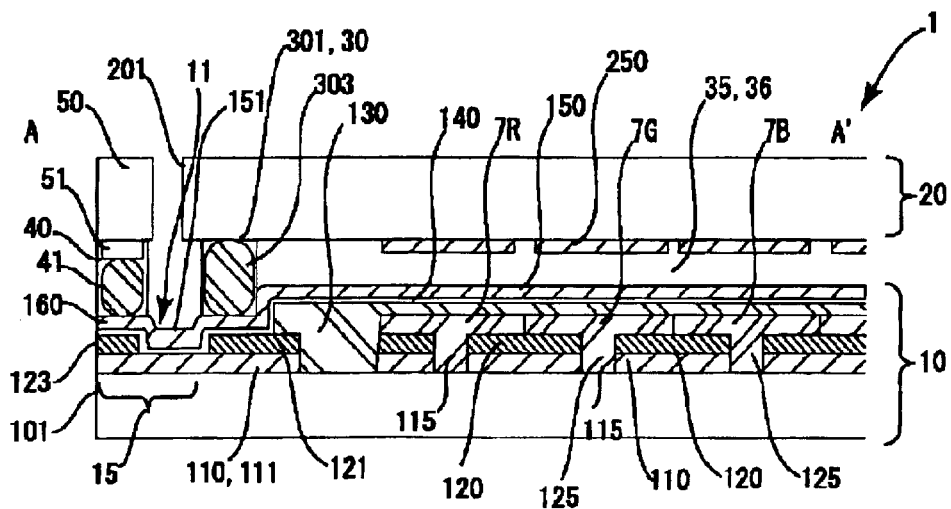
FIG. 8(A) and FIG. 8(B) are a cross-sectional view of an electro-optic apparatus according to a second embodiment of the present invention, taken on a line corresponding to the line A–A' shown in FIG. 3, and a cross-sectional view of the electro-optic apparatus taken on lines corresponding to the lines B1–B1' and B2–B2' shown in FIG. 3, respectively.
Figure 8B:
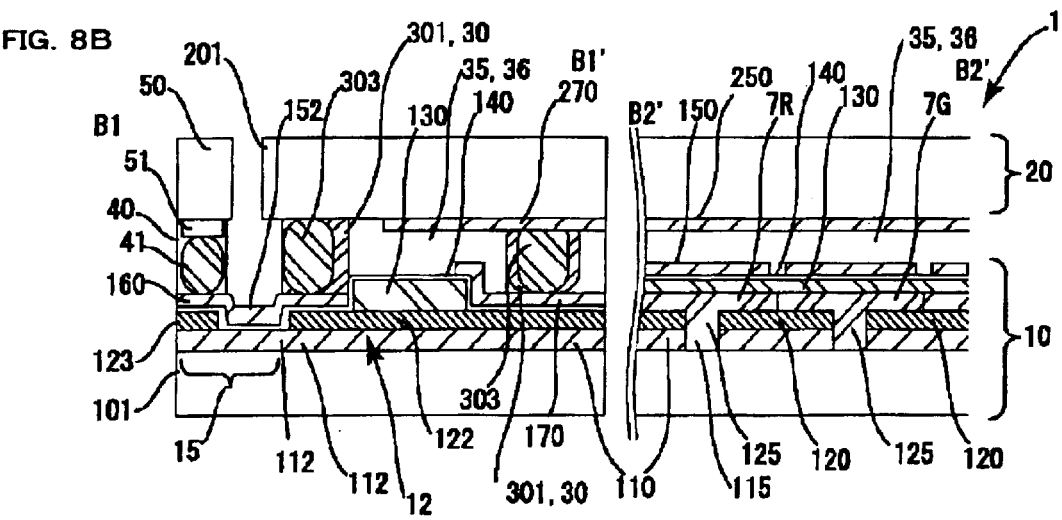

FIG. 8(A) and FIG. 8(B) are a cross-sectional view of an electro-optic apparatus taken on a line corresponding to the line A–A' shown in FIG. 3, and a cross-sectional view of the electro-optic apparatus taken on lines corresponding to the lines B1–B1' and B2–B2' shown in FIG. 3, respectively. FIG. 9(A) to FIG. 9(F) are views showing elements formed in the first substrate and the second substrate used in the electro-optic apparatus shown in FIG. 1. FIG. 10(A) to FIG. 10(F) and FIG. 11(A) to FIG. 11(F) are process sectional views showing a manufacturing method of a first substrate and a second substrate used in the electro-optic apparatus according to the present embodiment. Since the basic structures of the present embodiment and embodiments described below are the same as those of the first embodiment, the same symbols are assigned to the common portions, and a detailed description thereof is omitted.

In FIG. 8(A) and FIG. 8(B), also in the electro-optic apparatus according to the present embodiment, in the same way as in the first embodiment, a base electrically conductive film 110 made from an ITO film, an optical reflection film 120, a color filter layer 7R, 7G, and 7B, an organic insulating film 130 serving as a flattening film, an inorganic insulating film 140 made from a silicon oxide film or others, first driving electrodes 150 made from an ITO film, and an alignment film (not shown) are formed in that order from a lower layer side to an upper layer side in the first substrate 10.

Also in the present embodiment, the base electrically-conductive film 110 is formed in an image display area 2, and the optical reflection film 120 is formed at an upper-layer side of the base electrically-conductive film 110, on the first substrate 10. The optical reflection film 120 is partially removed and light transmission holes 125 are formed on the pixels where first driving electrodes 150 are opposed to second driving electrodes 250.

Further, in the present embodiment, holes 115 are formed in the base electrically-conductive film 110 at the positions immediately below those of the light transmission holes 125 in the optical reflection film 120. Therefore, when the color filter layer 7R, 7G, and 7B is formed at the upper-layer side of the optical reflection film 120, the color filter layer is thicker at the areas where the optical reflection film 120 is removed and the light transmission holes 125 are formed, than at the area where the optical reflection film 120 is formed, because the holes 115 are formed in the base electrically-conductive film 110 at the areas where the optical reflection film 120 is removed and the light transmission holes 125 are formed. Consequently, the color filter layer 7R, 7G, and 7B formed at the light transmission holes, used for transmission-mode display is sufficiently thicker than the color filter layer 7R, 7G, and 7B formed at the other area, used for reflection-mode display. Therefore, even when transmission display light passes through the color filter layer 7R, 7G, and 7B only once, and reflection display light passes through the color filter layer 7R, 7G, and 7B twice, once at input and once at output, a problem in which reflection-mode display is deeper in color than transmission-mode display when both modes are used does not occur. Thus, high-quality display is implemented.

Figure 9A:
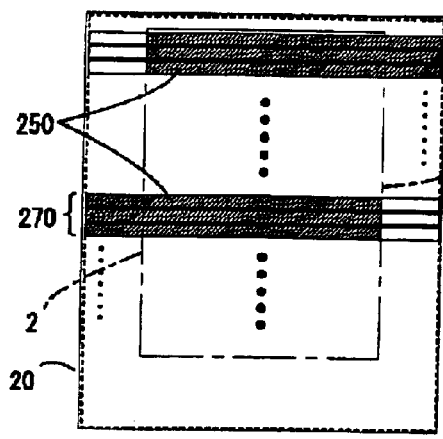
FIG. 9 is a view showing elements formed in a first substrate and a second substrate used in the electro-optic apparatus shown in FIG. 8.
Figure 9B:
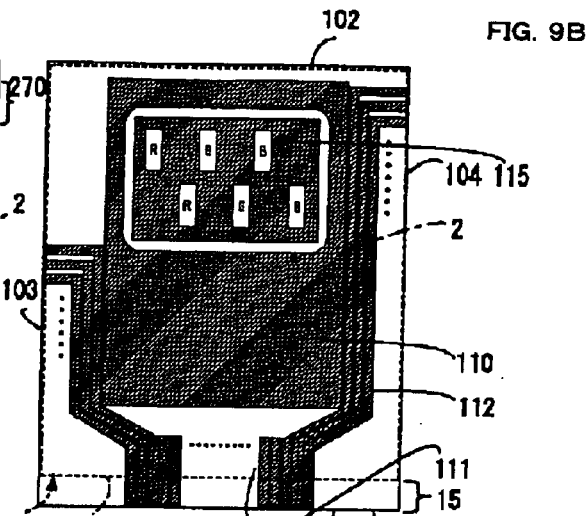
Figures 10A, 10B, 10C, 10D, 10E, 10F:
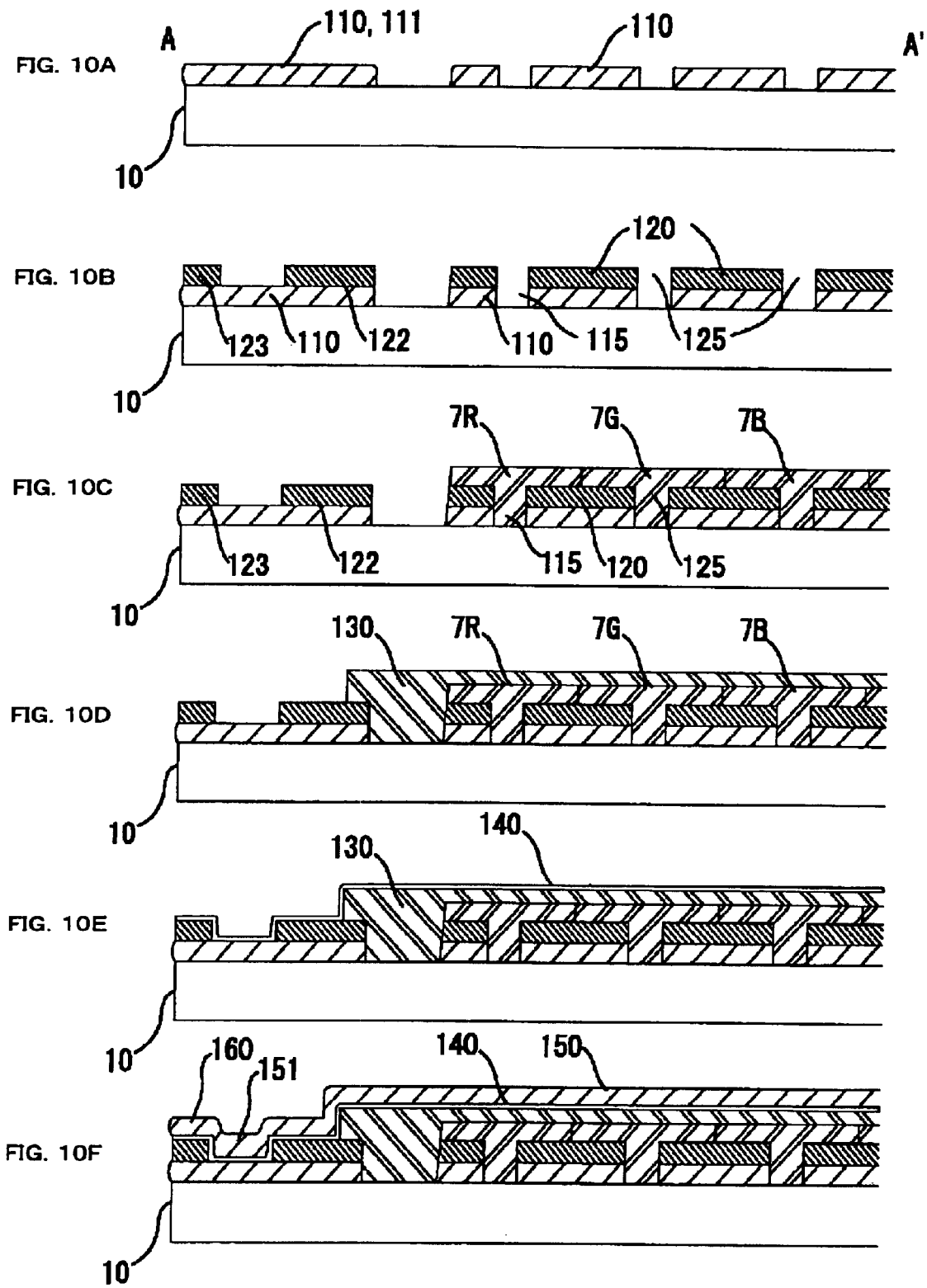
FIG. 10(A) to FIG. 10(F) are process sectional views showing a manufacturing method of the first substrate used in the electro-optic apparatus shown in FIG. 8, correspondingly to FIG. 8(A).

To manufacture the electro-optic apparatus according to the present embodiment, instead of the process described by referring to FIG. 5(B), FIG. 6(A), and FIG. 7(A) in the first embodiment, after an ITO film is formed over the entire substrate, when patterning is performed with the use of photolithography technology to form the base electrically-conductive film 110, the holes 115 need to be formed, as shown in FIG. 9(B), FIG. 10(A), and FIG. 11(A). Since the other structures are the same as those of the first embodiment, a description thereof is omitted.

Third Embodiment

Figure 12A:
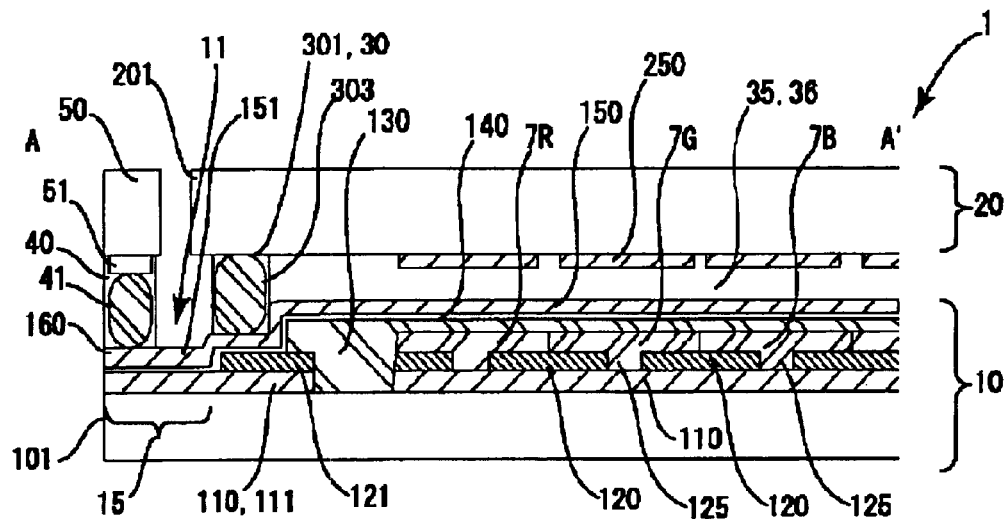
FIG. 12(A) and FIG. 12(B) are a cross-sectional view of an electro-optic apparatus according to a third embodiment of the present invention, taken on a line corresponding to the line A–A' shown in FIG. 3, and a cross-sectional view of the electro-optic apparatus taken on lines corresponding to the lines B1–B1' and B2–B2' shown in FIG. 3, respectively.
Figure 12B:
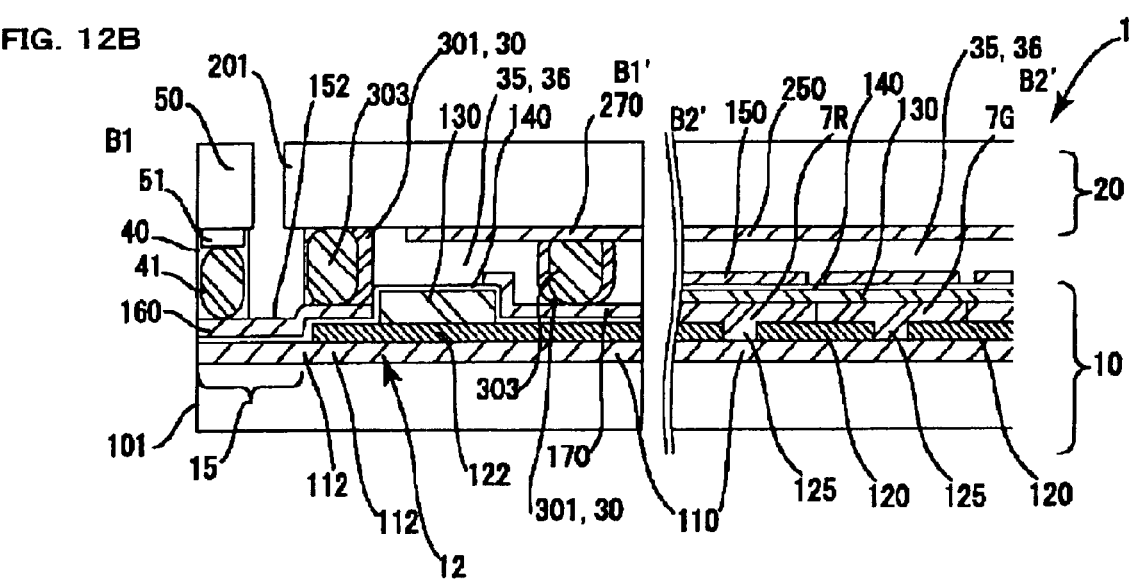
Figure 13A:
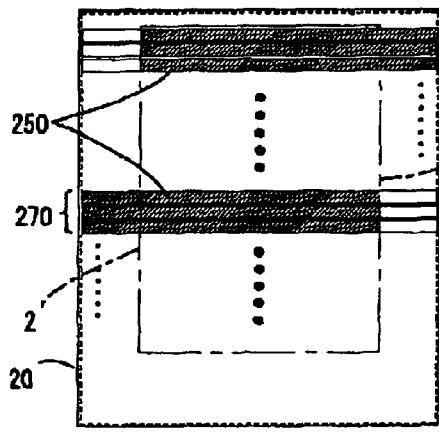
FIG. 13 is a view showing elements formed in a first substrate and a second substrate used in the electro-optic apparatus shown in FIG. 12.
Figure 13B:
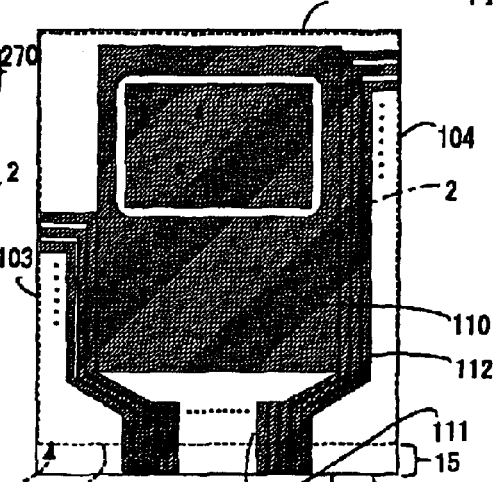
Figure 13C:
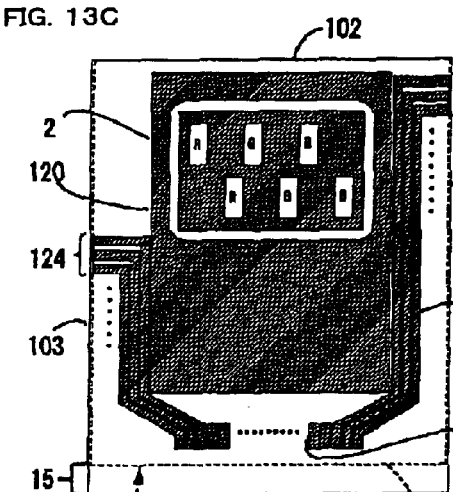
Figure 13D:
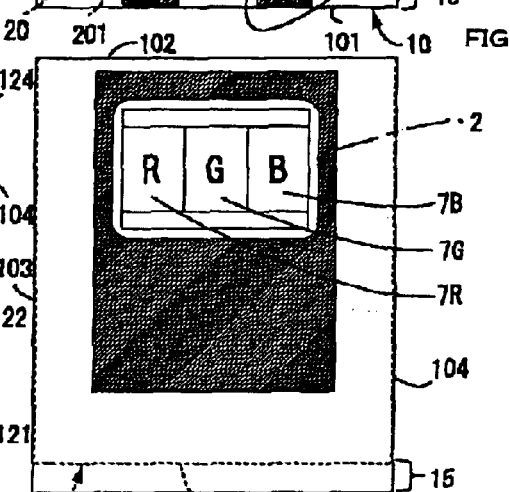
Figure 13E:
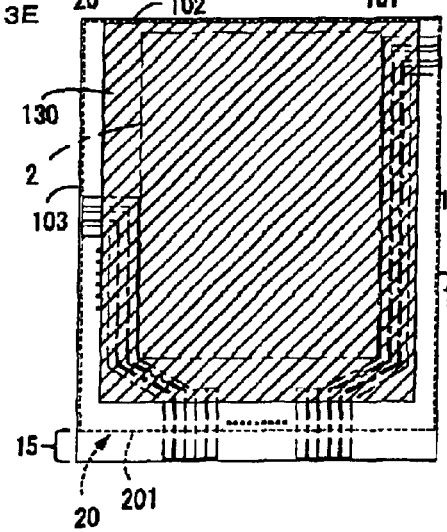
Figure 13F:
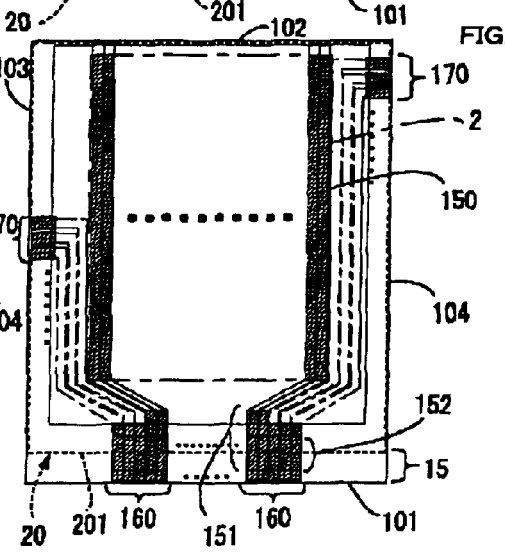
Figure 15A:
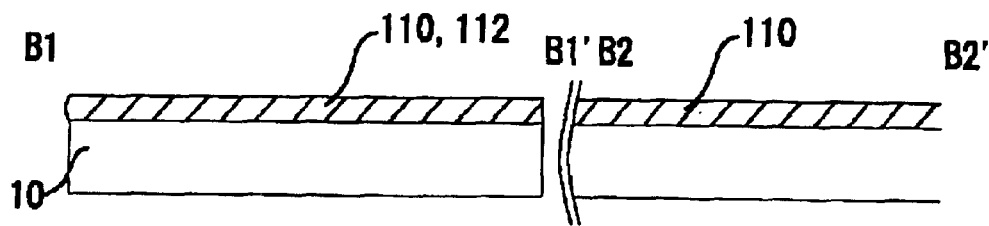
FIG. 15(A) to FIG. 15(F) are process sectional views showing a manufacturing method of the first substrate used in the electro-optic apparatus shown in FIG. 12, correspondingly to FIG. 12(B).
Figure 15B:
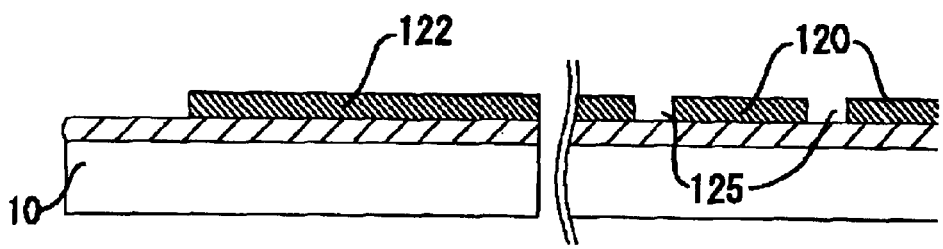
Figure 15C:
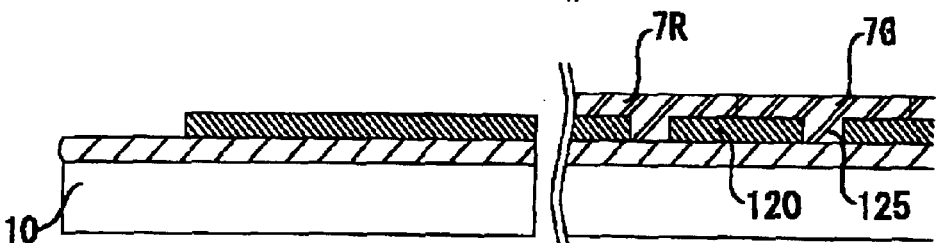
Figure 15D:
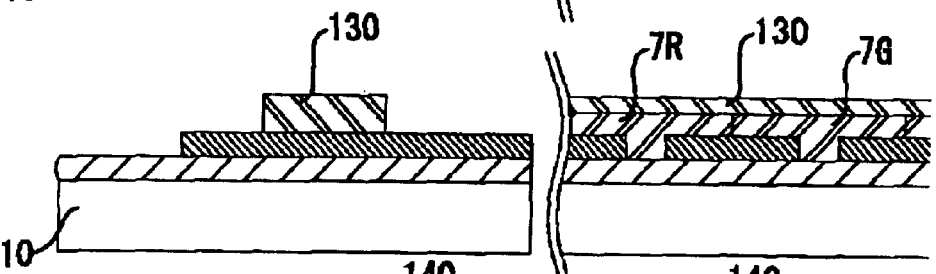
Figure 15E:
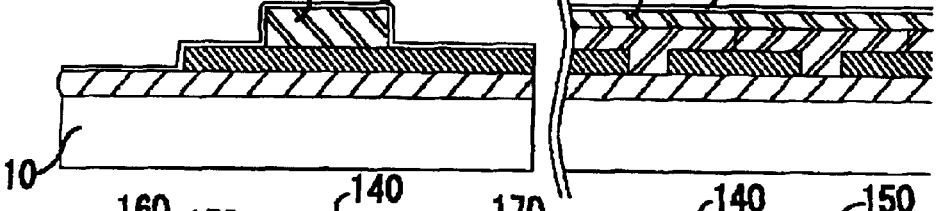
Figure 15F:
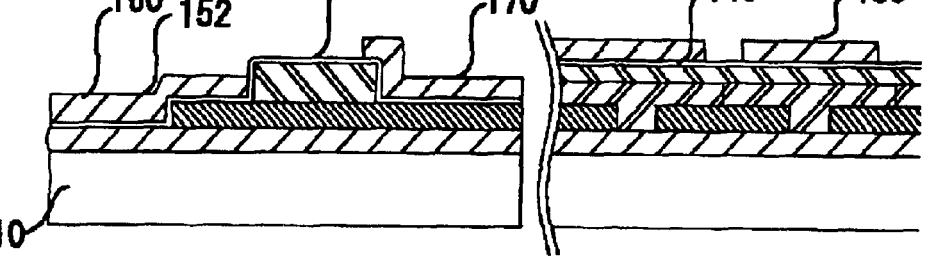

FIG. 12(A) and FIG. 12(B) are a cross-sectional view of an electro-optic apparatus taken on a line corresponding to the line A–A' shown in FIG. 3, and a cross-sectional view of the electro-optic apparatus taken on lines corresponding to the lines B1–B1' and B2–B2' shown in FIG. 3, respectively. FIG. 13(A) to FIG. 13(F) are views showing elements formed in the first substrate and the second substrate used in the electro-optic apparatus shown in FIG. 1. FIG. 14(A) to FIG. 14(F) and FIG. 15(A) to FIG. 15(F) are process sectional views showing a manufacturing method of a first substrate and a second substrate used in the electro-optic apparatus according to the present embodiment.

In FIG. 12(A) and FIG. 12(B), also in the electro-optic apparatus according to the present embodiment, in the same way as in the first embodiment, a base electrically conductive film 110 made from an ITO film, an optical reflection film 120, a color filter layer 7R, 7G, and 7B, an organic insulating film 130 serving as a flattening film, an inorganic insulating film 140 made from a silicon oxide film or others, first driving electrodes 150 made from an ITO film, and an alignment film (not shown) are formed in that order from a lower layer side to an upper layer side in the first substrate 10.

In the first embodiment, the metal film formed together with the optical reflection film 120 at the same time is left at the lower-layer side of the mounting terminals 160, as the base electrodes 123. In the present embodiment, a metal film is not left at a lower-layer side of mounting terminals 160.

Also in the case in which this structure is made, a driving IC 50 is mounted to the mounting terminals 160 connected to upper-layer wiring 151 and 152 of first wiring patterns 11 and second wiring patterns 12, by an anisotropic electrically-conductive film 40 in which electrically-conductive particles are mixed with a resin component. At the lower-layer side of the mounting terminals 160, the thin inorganic insulating film 140 made from a silicon oxide film is formed. At the lower-layer side of the inorganic insulating film 140, the base electrically-conductive film 110 is formed. Therefore, when the driving IC 50 is connected to the first substrate 10 by thermocompression bonding through the anisotropic electrically-conductive film 40, electrically-conductive particles 41 pass through the inorganic insulating film 140 by the pressure of the compression bonding, and the mounting terminals 160 are electrically connected to the lowest-layer wiring 111 and 112 of the first wiring patterns 11 and the second wiring patterns 12.

Figure 9C:
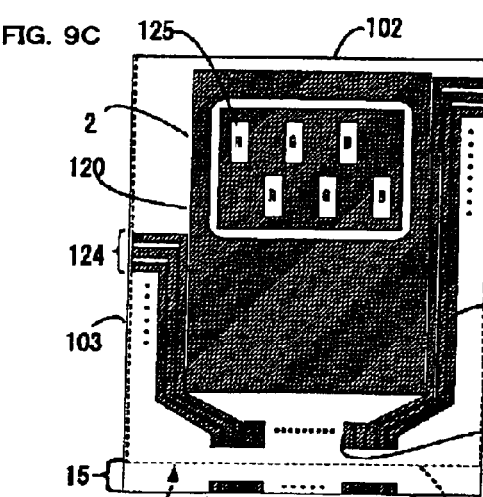
Figure 9D:
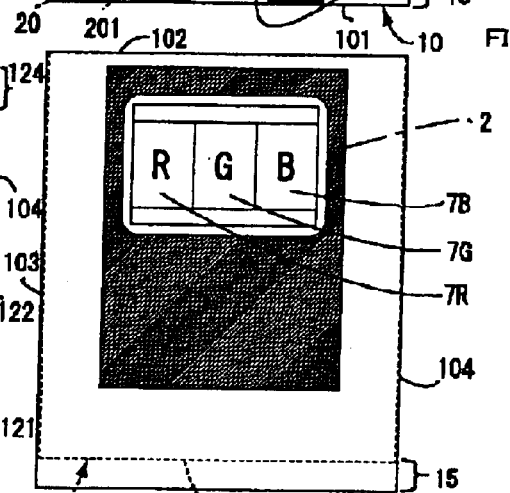
Figure 9E:
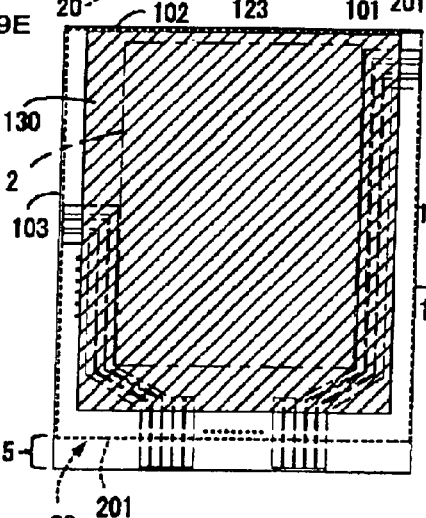
Figure 9F:
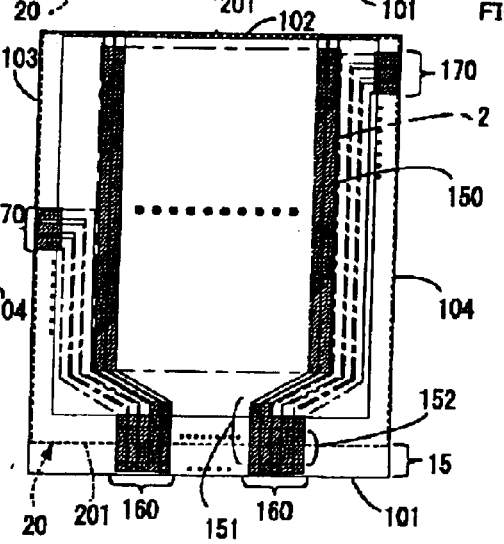

To manufacture the electro-optic apparatus according to the present embodiment, instead of the process described by referring to FIG. 5(C), FIG. 6(B), and FIG. 7(B) in the first embodiment, after a metal film is formed over the entire substrate, when patterning is performed with the use of photolithography technology to form the optical reflection film 120, the metal film needs to be removed from the area where the mounting terminals 160 are to be formed, as shown in FIG. 9(C), FIG. 10(C), and FIG. 11(C). Since the other structures are the same as those of the first embodiment, a description thereof is omitted.

Fourth Embodiment

Figure 16A:
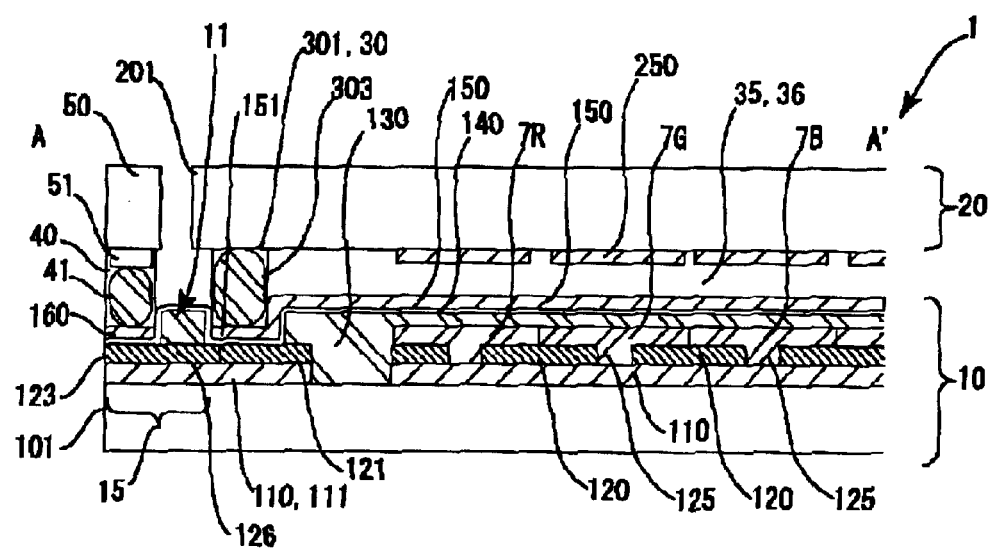
FIG. 16(A) and FIG. 16(B) are a cross-sectional view of an electro-optic apparatus according to a fourth embodiment of the present invention, taken on a line corresponding to the line A–A' shown in FIG. 3, and a cross-sectional view of the electro-optic apparatus taken on lines corresponding to the lines B1–B1' and B2–B2' shown in FIG. 3, respectively.
Figure 16B:
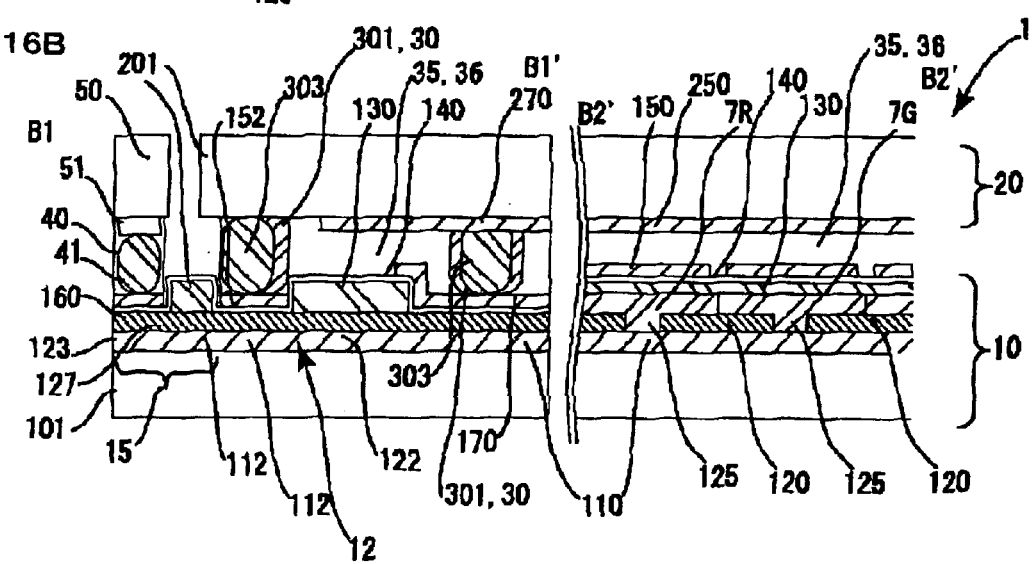

FIG. 16(A) and FIG. 16(B) are a cross-sectional view of an electro-optic apparatus taken on a line corresponding to the line A–A' shown in FIG. 3, and a cross-sectional view of the electro-optic apparatus taken on lines corresponding to the lines B1–B1' and B2–B2' shown in FIG. 3, respectively. FIG. 17(A) to FIG. 17(F) are views showing elements formed in the first substrate and the second substrate used in the electro-optic apparatus shown in FIG. 1. FIG. 18(A) to FIG. 18(F) and FIG. 19(A) to FIG. 19(F) are process sectional views showing a manufacturing method of a first substrate and a second substrate used in the electro-optic apparatus according to the present embodiment.

In FIG. 16(A) and FIG. 16(B), also in the electro-optic apparatus according to the present embodiment, in the same way as in the first embodiment, a base electrically conductive film 110 made from an ITO film, an optical reflection film 120, a color filter layer 7R, 7G, and 7B, an organic insulating film 130 serving as a flattening film, an inorganic insulating film 140 made from a silicon oxide film or others, first driving electrodes 150 made from an ITO film, and an alignment film (not shown) are formed in that order from a lower layer side to an upper layer side in the first substrate 10.

In the first embodiment, the metal film formed together with the optical reflection film 120 at the same time is not formed at the extending area 15 of the first substrate 10, where the first substrate 10 is exposed from the substrate side 201 of the second substrate 20, and is disconnected at this area. In the present embodiment, however, a metal film is formed at such an area as lower-layer wiring 126 of first wiring patterns 11 and lower-layer wiring 127 of second wiring patterns 12.

The organic insulating film 130 is left at an upper layer of the lower-layer wiring 126 of the first wiring patterns 11 and at an upper layer of the lower-layer wiring 127 of the second wiring patterns 12. Therefore, even when upper-layer wiring 151 and 152 of the first wiring patterns 11 and the second wiring patterns 12, formed of an ITO film formed together with the first driving electrodes 150 at the same time, is disconnected at the extending area 15 of the first substrate 10, where the first substrate 10 is exposed from the substrate side 201 of the second substrate 20, the wiring resistance does not increase.

Figure 17A:
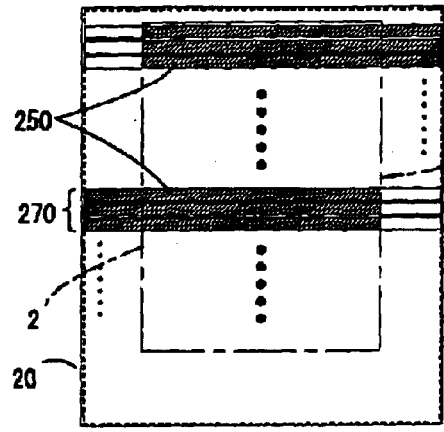
FIG. 17 is a view showing elements formed in a first substrate and a second substrate used in the electro-optic apparatus shown in FIG. 16.
Figure 17B:
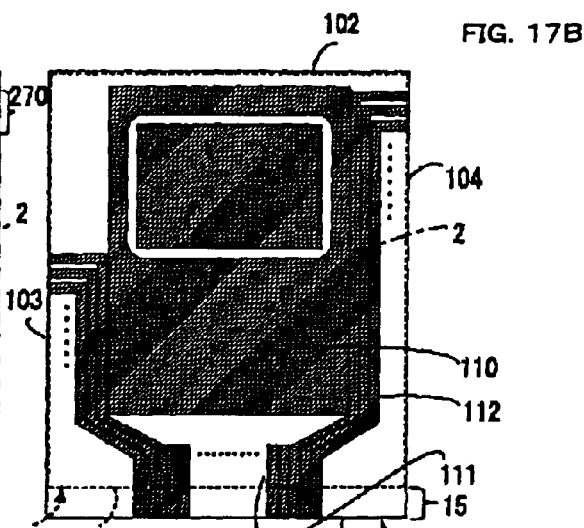
Figure 17C:
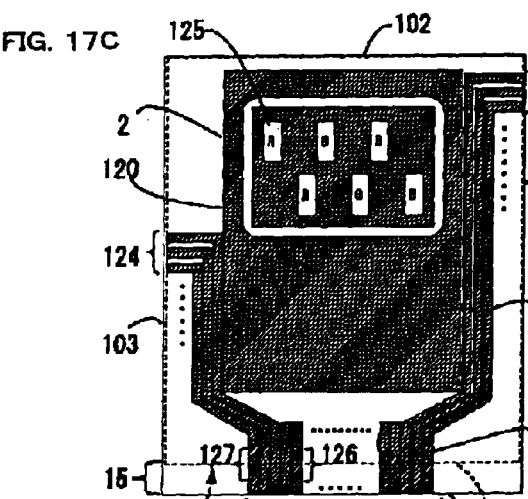
Figure 17D:
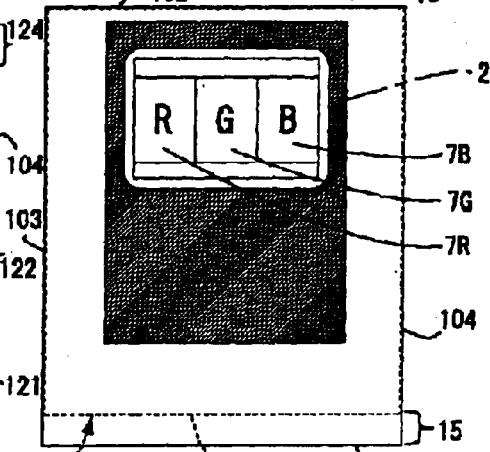
Figure 19A:
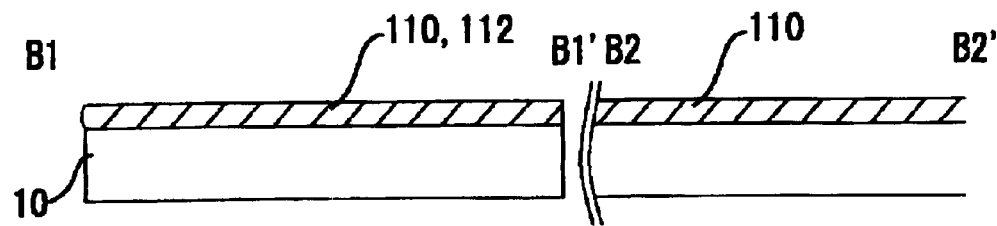
FIG. 19(A) to FIG. 19(F) are process sectional views showing a manufacturing method of the first substrate used in the electro-optic apparatus shown in FIG. 16, correspondingly to FIG. 16(B).
Figure 19B:
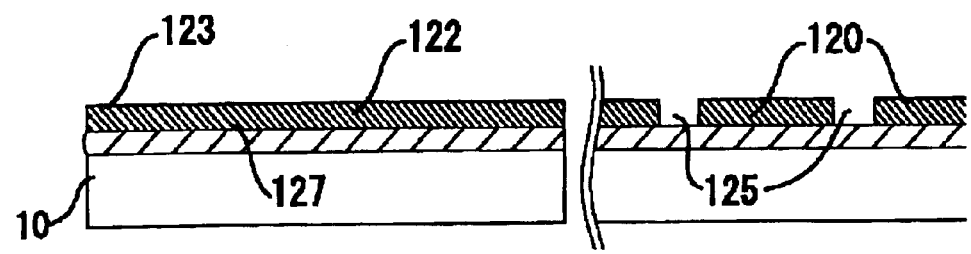
Figure 19C:
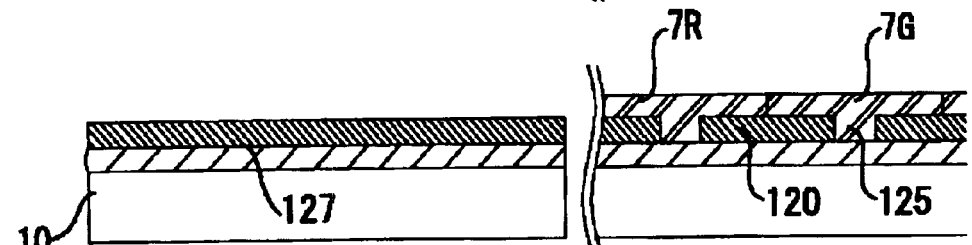

To manufacture the electro-optic apparatus having such a structure, as shown in FIG. 17(C), FIG. 18(B), and FIG. 19(B), after a metal film made from a silver alloy film or others is formed at an upper layer of the base electrically-conductive film 110, when patterning is performed with the use of photolithography technology to form the optical reflection film 120 in a plane manner in an image display area 2, the metal film is left as the lower-layer wiring 126 of the first wiring patterns 11 and the lower-layer wiring 127 of the second wiring patterns 12 at the extending area 15 of the first substrate 10, where the first substrate 10 is exposed from the substrate side 201 of the second substrate 20.

Figure 17E:
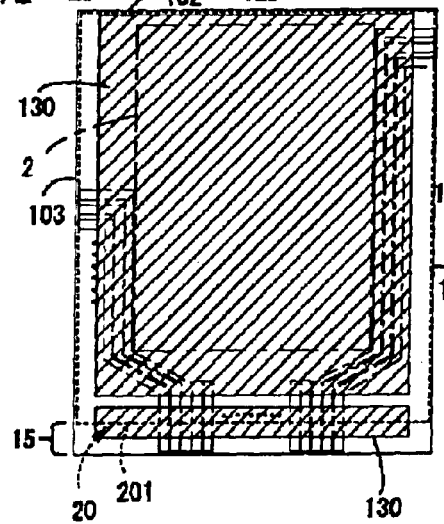
Figure 19D:
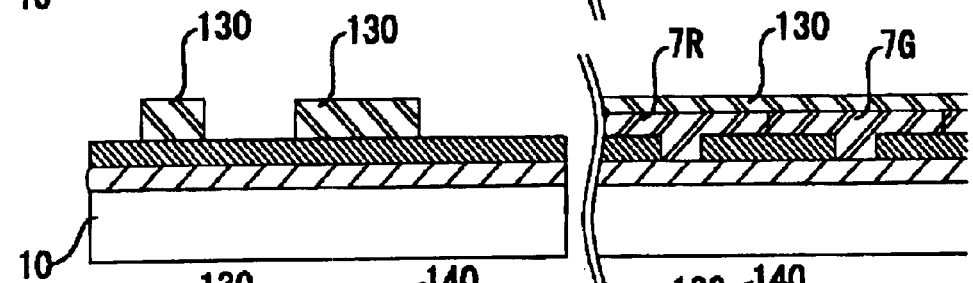
Figure 19E:
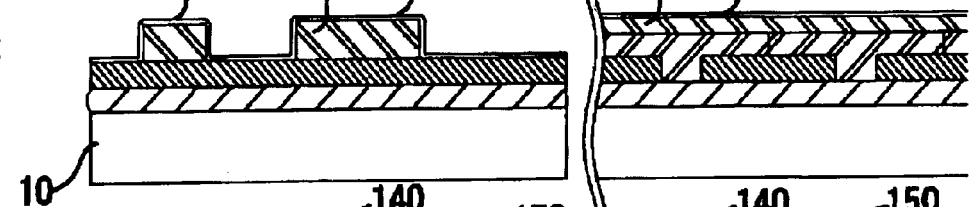

Further, as shown in FIG. 17(E), FIG. 18(D), and FIG. 19(D), after the thick organic insulating film 130 is formed at an upper layer of the color filter layer 7R, 7G, and 7B, when patterning is performed with the use of photolithography technology to selectively leave the organic insulating film 130 (a hatched area) in the image display area 2, the organic insulating film 130 is left so as to cover the lower-layer wiring 126 of the first wiring patterns 11 and the lower-layer wiring 127 of the second wiring patterns 12 at the extending area 15 of the first substrate 10, where the first substrate 10 is exposed from the substrate side 201 of the second substrate 20.

Figure 17F:
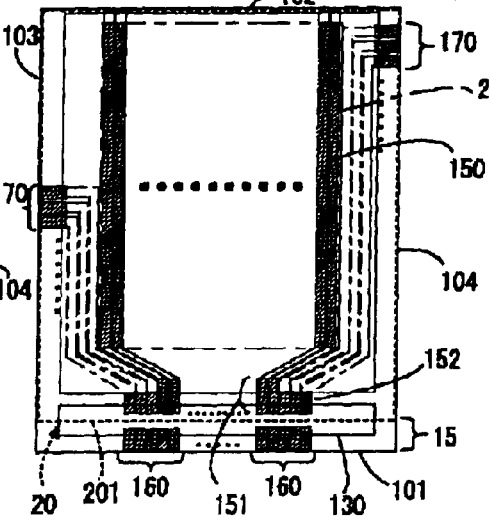
Figure 19F:
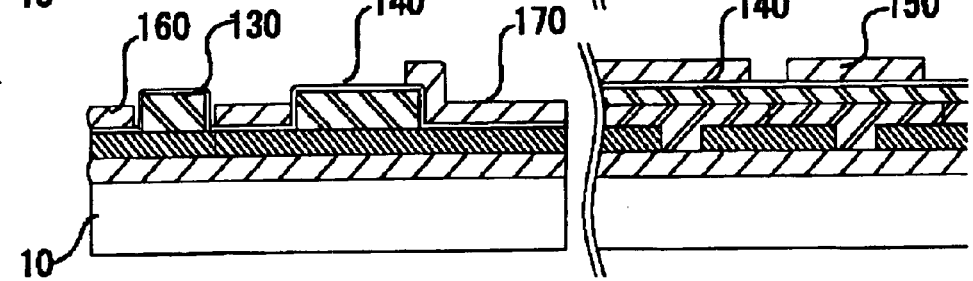

Therefore, as shown in FIG. 17(F), FIG. 18(F), and FIG. 19(F), after an ITO film is formed over the entire substrate at an upper layer of the inorganic insulating film 140, when patterning is performed with the use of photolithography technology to form the first driving electrodes 150 (a hatched area) in the image display area 2, since the lower-layer wiring 126 of the first wiring patterns 11 and the lower-layer wiring 127 of the second wiring patterns 12 are protected by the organic insulating film 130 at the extending area 15 of the first substrate 10 where the first substrate 10 is exposed from the substrate side 201 of the second substrate 20, corrosion does not occur at the lower-layer wiring 126 and 127.

After the electro-optic apparatus has been completed, since the lower-layer wiring 126 of the first wiring patterns 11 and the lower-layer wiring 127 of the second wiring patterns 12 are protected by the organic insulating film 130 at the extending area 15 of the first substrate 10, where the first substrate 10 is exposed from the substrate side 201 of the second substrate 20, corrosion does not occur and there is no need to apply resin mold to the portions.

Since the other structures are the same as those in the first embodiment, a description thereof is omitted.

Fifth Embodiment

Figure 20A:
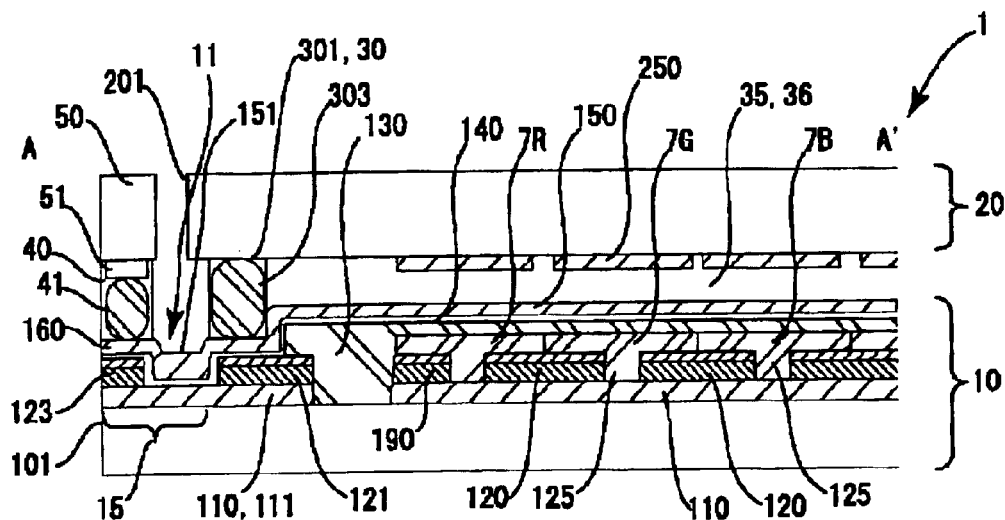
FIG. 20(A) and FIG. 20(B) are a cross-sectional view of an electro-optic apparatus according to a fifth embodiment of the present invention, taken on a line corresponding to the line A–A' shown in FIG. 3, and a cross-sectional view of the electro-optic apparatus taken on lines corresponding to the lines B1–B1' and B2–B2' shown in FIG. 3, respectively.
Figure 20B:
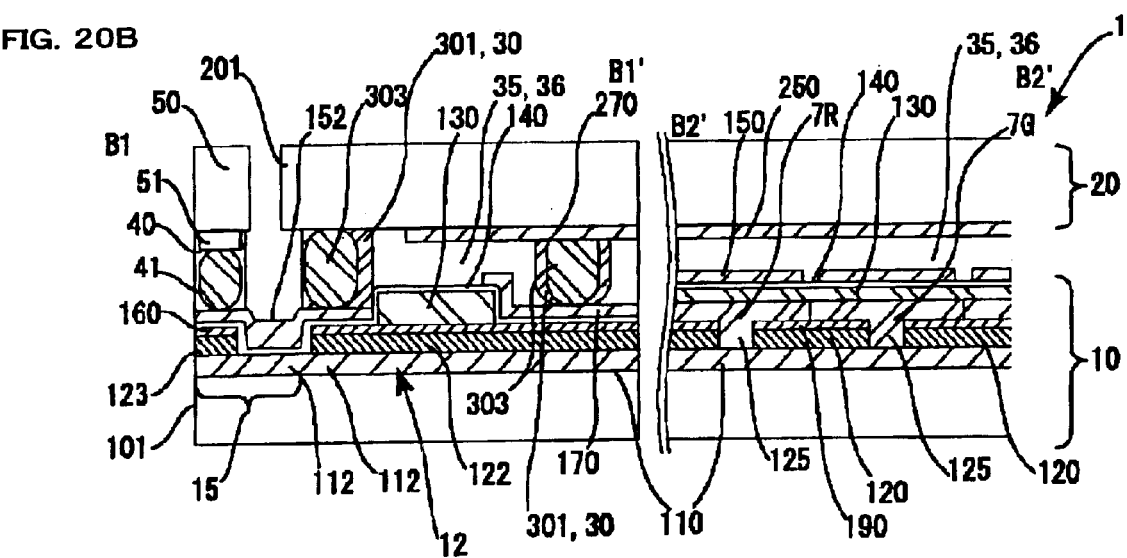

FIG. 20(A) and FIG. 20(B) are a cross-sectional view of an electro-optic apparatus taken on a line corresponding to the line A–A' shown in FIG. 3, and a cross-sectional view of the electro-optic apparatus taken on lines corresponding to the lines B1–B1' and B2–B2' shown in FIG. 3, respectively.

In FIG. 20(A) and FIG. 20(B), also in the electro-optic apparatus according to the present embodiment, in the same way as in the first embodiment, a base electrically conductive film 110 made from an ITO film, an optical reflection film 120, a color filter layer 7R, 7G, and 7B, an organic insulating film 130 serving as a flattening film, an inorganic insulating film 140 made from a silicon oxide film or others, first driving electrodes 150 made from an ITO film, and an alignment film (not shown) are formed in that order from a lower layer side to an upper layer side in a first substrate 10.

In the first embodiment, the color filter layer 7R, 7G, and 7B is formed directly on the metal layer formed together with the optical reflection film 120 at the same time. In the present embodiment, an electrically-conductive protection film 190 made from an ITO film is formed at an upper layer of a silver alloy film serving as the optical reflection film 120. Therefore, when the color filter layer 7R, 7G, and 7B is formed, even in burning, problems, such as discoloration at the surface of the silver alloy film caused by the heat of burning, can be prevented. In addition, when patterning is applied to the electrically-conductive protection film 190 with the use of photolithography technology, since an exposure mask used when the optical reflection film 120 is formed can be used as it is, manufacturing cost does not increase largely.

The other structures, such as the plane layout of each layer, are the same as those in the first embodiment, a description thereof is omitted.

Sixth Embodiment

Figure 21A:
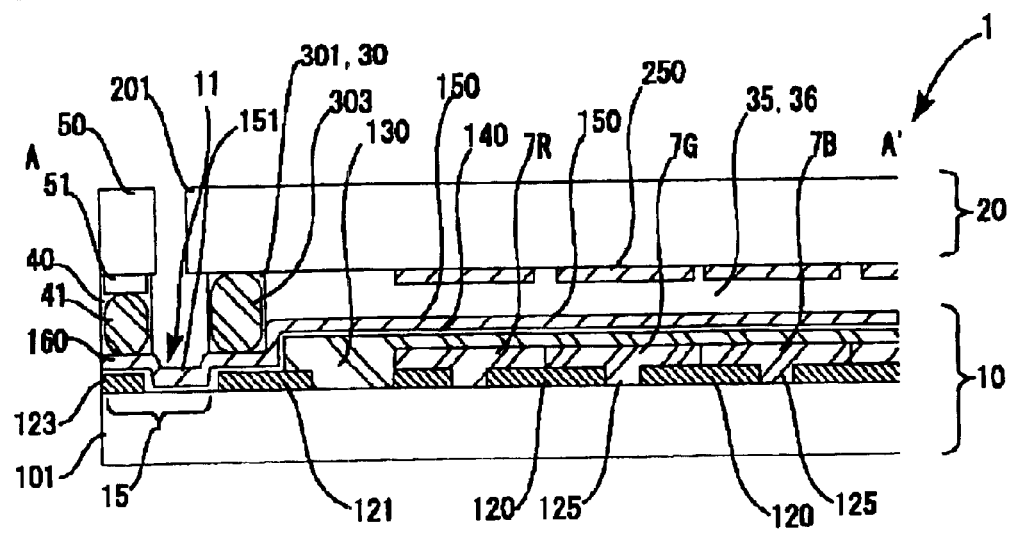
FIG. 21(A) and FIG. 21(B) are a cross-sectional view of an electro-optic apparatus according to a sixth embodiment of the present invention, taken on a line corresponding to the line A–A' shown in FIG. 3, and a cross-sectional view of the electro-optic apparatus taken on lines corresponding to the lines B1–B1' and B2–B2' shown in FIG. 3, respectively.
Figure 21B:
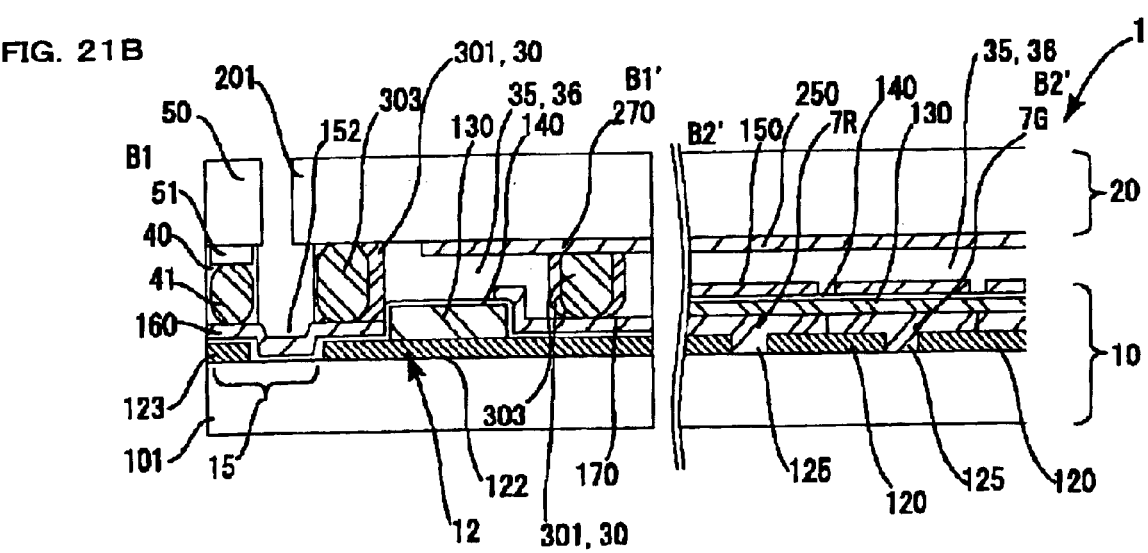

FIG. 21(A) and FIG. 21(B) are a cross-sectional view of an electro-optic apparatus taken on a line corresponding to the line A–A' shown in FIG. 3, and a cross-sectional view of the electro-optic apparatus taken on lines corresponding to the lines B1–B1' and B2–B2' shown in FIG. 3, respectively.

In FIG. 21(A) and FIG. 21(B), in a first substrate 10 of the electro-optic apparatus according to the present embodiment, an aluminum film is used as an optical reflection film 120. Unlike a silver alloy film, an aluminum film has a good close contact property with a glass base and others. Therefore, in the present embodiment, the optical reflection film 120 is directly formed on a base, and a color filter layer 7R, 7G, and 7B, an organic insulating film 130 serving as a flattening film, an inorganic insulating film 140 made from a silicon oxide film or others, first driving electrodes 150 made from an ITO film, and an alignment film (not shown) are formed in that order above the optical reflection film 120 in the first substrate 10.

Also in the case in which such a structure is made, for example, before the first substrate 10 and a second substrate 20 are connected by thermocompression bonding through a sealing member 30 which includes electrically-conductive particles 303 at the area where the first inter-substrate electric-connection terminals 170 are formed, the inorganic insulating film 140 is formed at a lower-layer side of the first inter-substrate electric-connection terminals 170. At the lower-layer side of the inorganic insulating film 140, lower-layer wiring 122 of second wiring patterns 12 formed together with the optical reflection film 120 at the same time is formed. Therefore, when the first substrate 10 and the second substrate 20 are connected by thermocompression bonding through the sealing member 301, the electrically-conductive particles 303 pass through the inorganic insulating film 140 due to the pressure of the compression bonding, so that the first-substrate electric-connection terminals 170 are electrically connected to the lower-layer wiring 122 of the second wiring patterns 12.

The other structures, such as the plane layout of each layer, are the same as those in the first embodiment, a description thereof is omitted.

Seventh Embodiment

Figure 22A:
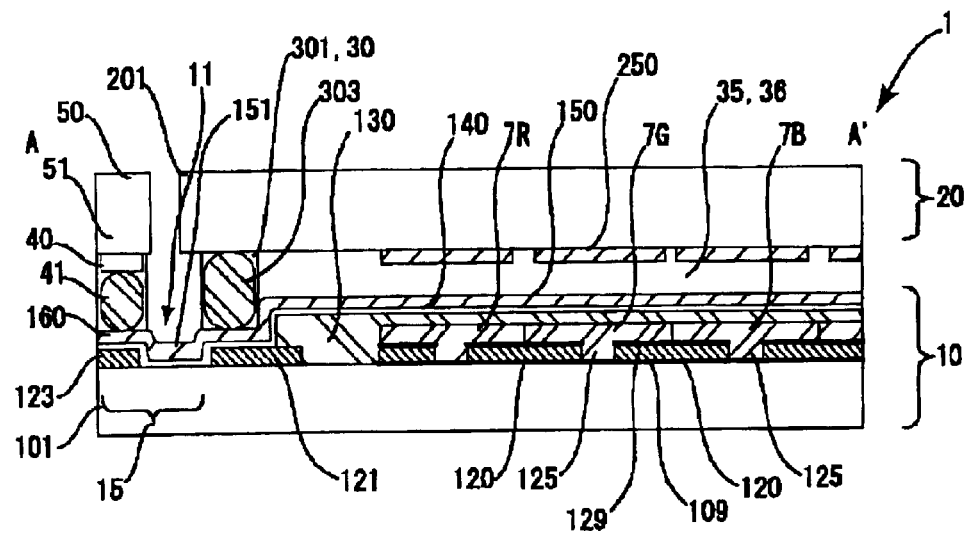
FIG. 22(A) and FIG. 22(B) are a cross-sectional view of an electro-optic apparatus according to a seventh embodiment of the present invention, taken on a line corresponding to the line A–A' shown in FIG. 3, and a cross-sectional view of the electro-optic apparatus taken on lines corresponding to the lines B1–B1' and B2–B2' shown in FIG. 3, respectively.
Figure 22B:
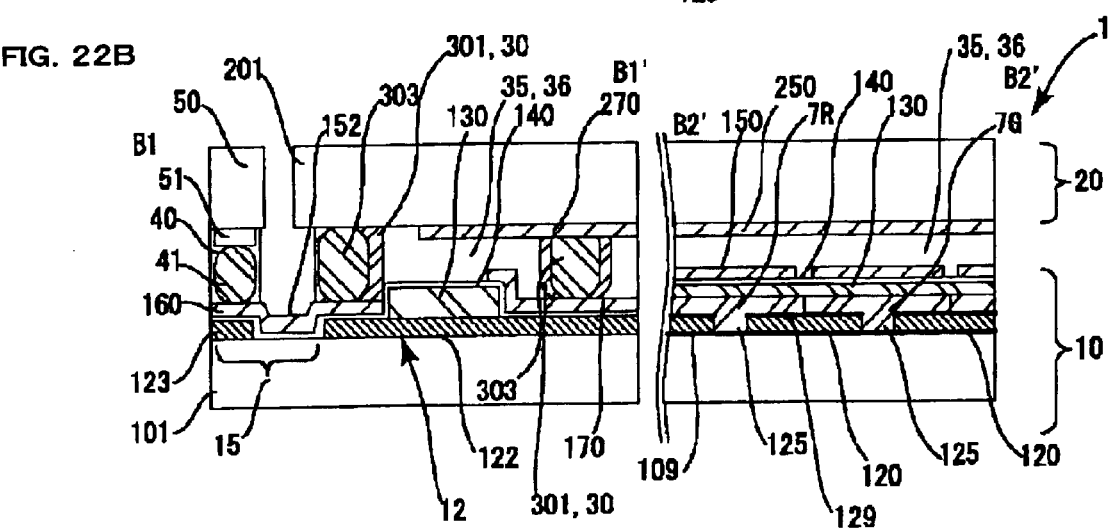

FIG. 22(A) and FIG. 22(B) are a cross-sectional view of an electro-optic apparatus taken on a line corresponding to the line A–A' shown in FIG. 3, and a cross-sectional view of the electro-optic apparatus taken on lines corresponding to the lines B1–B1' and B2–B2' shown in FIG. 3, respectively.

As shown in FIG. 22(A) and FIG. 22(B), in a seventh embodiment, uneven portions 19 may be made at the surface of a substrate at a lower-layer side of an optical reflection film 120 to make uneven portions 129 at the upper surface (reflection plane) of the optical reflection film 120. With this structure, since reflected light is output as diffused light, angle-of-view dependency of display is eliminated.

Other Embodiments

In the above embodiments, a silver alloy film or an aluminum film is used as an optical reflection film. An aluminum alloy film, or a multi-layer structure formed of a molybdenum film or a molybdenum alloy film, and an aluminum film or an aluminum alloy film may be used.

An electro-optic apparatus according to the present invention can be applied not only to the liquid-crystal apparatuses described above, but also to electroluminescence apparatuses, especially to organic electroluminescence apparatuses and inorganic electroluminescence apparatuses, plasma display apparatuses, field emission display (FED) apparatuses, light-emitting diode (LED) display apparatuses, electro-phoresis display apparatuses, thin cathode-ray tubes, compact TV receivers using a liquid-crystal shutter, and an apparatus using a digital micro-mirror device (DMD).

Applications to Electronic Units

An example electronic unit provided with an electro-optic apparatus according to the present invention will be described next by referring to FIG. 23.

Figure 23:
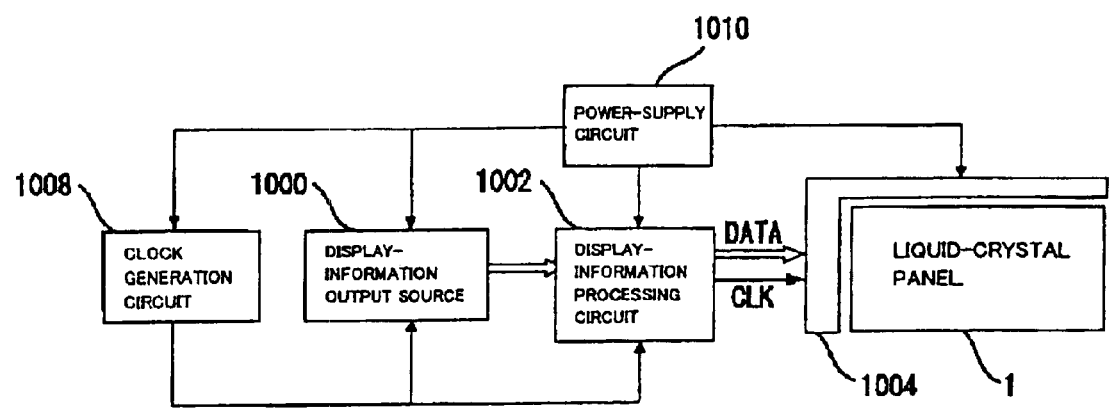
FIG. 23 is a block diagram showing the electrical structure of an electronic unit using an electro-optic apparatus according to the present invention.

FIG. 23 is a block diagram showing the structure of the electronic unit having an electro-optic apparatus 1 structured in the same way as the above-described electro-optic apparatuses.

In FIG. 23, the electronic unit includes a display-information output source 1000, a display-information processing circuit 1002, a driving circuit 1004 having a control circuit for switching display mode, the electro-optic apparatus 1, a clock generation circuit 1008, and a power-supply circuit 1010. The display-information output source 1000 includes a memory such as a read-only memory (ROM), a random access memory (RAM), or an optical disk, and a tuning circuit for tuning to an image signal on a television signal to output it, and processes an image signal having a predetermined format and outputs it to the display-information processing circuit 1002 according to a clock signal sent from the clock generation circuit 1008. The display-information output circuit 1002 includes known various processing circuits, such as an amplification and polarity-inversion circuit, a phase development circuit, a rotation circuit, a gamma compensation circuit, or a clamp circuit, and sequentially generates digital signals from display information input according to the clock signal and outputs them to the driving circuit 1004 together with the clock signal CLK. The driving circuit 1004 drives the electro-optic apparatus 1. The power-supply circuit 1010 supplies predetermined power to each circuit described above.

As electronic units having such a structure, mobile personal computers, portable telephones, personal computers (PC) handling multimedia, engineering workstations (EWS) handling multimedia, pagers, word processors, TV receivers, view-finder or direct-monitor-view video cassette tape recorders, electronic pocket books, electronic pocket calculators, car navigation apparatuses, POS terminals, and touch sensitive panels can be taken as examples.

Advantages

As described above, in an electro-optic apparatus according to the present invention, since the second wiring patterns which connect the mounting terminals to the first inter-substrate electric-connection terminals are made from the metal film constituting the optical reflection film, their electric resistance is made small. The color filter layer is formed between the optical reflection film and the first driving electrodes, and the light transmission holes are made in the optical reflection film at the lower-layer side of the color filter layer. Therefore, the color filter layer formed at the light transmission holes used for transmission-mode display is thicker than the color filter layer formed at the other area, used for reflection-mode display. Consequently, even when transmission display light passes through the color filter layer only once and reflection display light passes through the color filter layers twice, once at input and once at output, a problem in which reflection-mode colors are deeper than transmission-mode colors when both modes are used does not occur. Thus, high-quality display is implemented.

The entire disclosure of Japanese Patent Application No. 2002-271478 filed Sep. 18, 2002 is incorporated by reference.

What is claimed is:

1. An electro-optic apparatus comprising:
    a first substrate;
    a second substrate attached to the first substrate with a predetermined gap disposed therebetween by a sealing member; and
    an electro-optic-material layer held in an area partitioned by the sealing member within the gap, wherein first transparent driving electrodes and second transparent driving electrodes formed on the first substrate and the second substrate, respectively, apply an electric field to the electro-optic-material layer,
    the first substrate including:
        mounting terminals formed at an extending area over the second substrate;
        first inter-substrate electric-connection terminals formed at an area where the first substrate and the second substrate overlap;
        first wiring patterns connecting the mounting terminals to the first driving electrodes; and
        second wiring patterns connecting the mounting terminals to the first inter-substrate electric-connection terminals,
    the second substrate including:
        second inter-substrate electric-connection terminals opposed to the first inter-substrate electric-connection terminals,
    an optical reflection film in which light transmission holes are formed at part of an area overlapping with an area where the first driving electrodes and the second driving electrodes are opposed is formed at a lower-layer side of the first driving electrodes of the first substrate, and a color filter layer is formed between the optical reflection film and the first driving electrodes, and
    the second wiring patterns have metal wiring at least partially formed of the same metal film as the optical reflection film.

2. An electro-optic apparatus according to claim 1, wherein the mounting terminals and the first inter-substrate electric-connection terminals are formed of a transparent electrically-conductive film constituting the first driving electrodes.

3. An electro-optic apparatus according to claim 1, wherein, between the color filter layer and the first driving electrodes, a transparent organic insulating film is formed except at least at areas where the first inter-substrate electric-connection terminals and the mounting terminals are formed, and
    an inorganic insulating film is formed over almost all of the first substrate between the organic insulating film and the first driving electrodes.

4. An electro-optic apparatus according to claim 3, wherein the metal wiring for the first wiring patterns and the second wiring patterns is disconnected at an area exposed from a substrate side of the second substrate.

5. An electro-optic apparatus according to claim 3, wherein the metal wiring for the first wiring patterns and the second wiring patterns is also formed at an area exposed from a substrate side of the second substrate, and
    the organic insulating film is formed at an upper-layer side of the metal wiring at the exposed area.

6. An electro-optic apparatus according to claim 3 wherein the mounting terminals and bumps for a driving IC are electrically connected through electrically-conductive particles scattered in a resin component, and the electrically-conductive particles pass through the inorganic insulating film formed at the mounting terminals.

7. An electro-optic apparatus according to claim 3, wherein the first inter-substrate electric-connection terminals and the second inter-substrate electric-connection terminals are electrically connected through electrically-conductive particles scattered in a resin component, and the electrically-conductive particles pass through the inorganic insulating film formed at a lower-layer side of the first inter-substrate electric-connection terminals.

8. An electro-optic apparatus according to claim 1, wherein the first wiring patterns extend, in an area where the mounting terminals are formed, from the mounting terminals arranged at a center area thereof toward an opposed substrate side to connect to the first driving electrodes,
    the second wiring patterns extend, in the area where the mounting terminals are formed, from the mounting terminals arranged at both-side areas thereof, outside the area where the first wiring patterns are formed, to connect to the first inter-substrate electric-connection terminals arranged along substrate sides at both-side areas of an image display area, and
    the second driving electrodes extend in a direction intersected with the first driving electrodes in the image display area to connect to the second inter-substrate electric-connection terminals.

9. An electro-optic apparatus according to claim 1, wherein a base electrically-conductive film is formed at a lower-layer side of an area where at least the metal film constituting the optical reflection film is formed.

10. An electro-optic apparatus according to claim 9, wherein holes are formed in the base electrically-conductive film at areas overlapped with the light transmission holes.

11. An electro-optic apparatus according to claim 9, wherein the base electrically-conductive film is also formed at a lower-layer side of the mounting terminals and at a lower-layer side of the first inter-substrate electric-connection terminals.

12. An electro-optic apparatus according to claim 9, wherein the optical reflection film has a two-laminated-layer structure in which an aluminum alloy film or an aluminum film serves as the upper layer, and a molybdenum film or a molybdenum alloy film serves as the lower layer serving as an intermediate layer between the upper layer and the base electrically-conductive film.

13. An electro-optic apparatus according to claim 1, wherein an electrically-conductive protection film is formed at an upper layer of an area where the metal film constituting the optical reflection film is formed.

14. An electro-optic apparatus according to claim 1, wherein the optical reflection film is made from one of a silver alloy film, an aluminum alloy film, and an aluminum film.

15. An electro-optic apparatus according to claim 1, wherein the metal film constituting the optical reflection film is also formed at the mounting terminals and the first inter-substrate electric-connection terminals.

16. An electronic unit comprising an electro-optic apparatus according to claim 1, as a display section.

* * * * *

UNITED STATES PATENT AND TRADEMARK OFFICE
CERTIFICATE OF CORRECTION

PATENT NO. : 6,882,390 B2  Page 1 of 1
APPLICATION NO. : 10/666954
DATED : April 19, 2005
INVENTOR(S) : Shoji Hinata It is certified that error appears in the above-identified patent and that said Letters Patent is hereby corrected as shown below:

Please correct the title as follows (PTO error):

On the Title Page (54)
Please delete "Including Reflection Film With Transmission Holes and Wiring Patterns Formed of Same Metal Film as Reflection Film"

The correct title is shown below:

-- ELECTRO-OPTIC APPARATUS AND ELECTRONIC UNIT --.

Signed and Sealed this

Fifth Day of February, 2008

JON W. DUDAS
*Director of the United States Patent and Trademark Office*